United States Patent [19]

Amada et al.

[11] Patent Number: 5,719,943
[45] Date of Patent: Feb. 17, 1998

[54] DIGITAL INFORMATION SIGNAL TRANSMITTING/RECEIVING METHOD AND SYSTEM

[75] Inventors: Nobutaka Amada; Shigeru Yamazaki; Takaharu Noguchi, all of Yokohama; Hideo Nishijima, Hitachinaka; Hiroaki Ono, Fujisawa; Hiroo Okamoto, Yokohama; Hitoaki Owashi, Yokohama; Takao Arai, Yokohama; Yuji Hatanaka, Yokohama; Seiichi Saito, Tokyo, all of Japan

[73] Assignee: Hitachi, Ltd., Tokyo, Japan

[21] Appl. No.: 409,804

[22] Filed: Mar. 24, 1995

[30] Foreign Application Priority Data

Mar. 28, 1994 [JP] Japan .................... 6-056945
Mar. 31, 1994 [JP] Japan .................... 6-063579

[51] Int. Cl.$^6$ .............. H04L 9/00; H04N 7/167
[52] U.S. Cl. ............ 380/49; 380/4; 380/5; 380/9; 380/10; 380/23
[58] Field of Search .............. 380/3, 4, 5, 9, 380/10, 20, 23, 25, 49

[56] References Cited

U.S. PATENT DOCUMENTS

| | | | |
|---|---|---|---|
| 4,945,563 | 7/1990 | Horton et al. | 380/5 |
| 4,991,208 | 2/1991 | Walker et al. | 380/20 |
| 5,046,092 | 9/1991 | Walker et al. | 380/20 |
| 5,134,496 | 7/1992 | Schwab et al. | 380/5 X |
| 5,418,853 | 5/1995 | Kanota et al. | 380/5 |
| 5,497,420 | 3/1996 | Garneau | 380/20 |
| 5,555,308 | 9/1996 | Levien | 380/20 |

FOREIGN PATENT DOCUMENTS

| | | |
|---|---|---|
| 0338866 | 10/1989 | European Pat. Off. . |
| 0450841 | 10/1991 | European Pat. Off. . |
| 0506435 | 9/1992 | European Pat. Off. . |
| 0589459 | 3/1994 | European Pat. Off. . |

OTHER PUBLICATIONS

M.Harada, "5-3 Future View of Catv," Journal of the Institute of Television Engineers of Japan, (vol. 47, No. 4, 1993; pp. 494-499).

*Primary Examiner*—Bernarr E. Gregory
*Attorney, Agent, or Firm*—Antonelli, Terry, Stout, & Kraus, LLP

[57] ABSTRACT

A digital information signal transmitting/receiving method and system having a transmitter for transmitting an encrypted digital information signal and a plurality of receivers for receiving the encrypted digital information signal from the transmitter. The transmitter simultaneously distributes a plurality of identification codes associated with the receivers at a time ahead of the digital information signal. The receivers detect whether a particular identification code assigned to the receiver was included within a received plurality of identification codes. When the particular identification code has been detected as having been received the received encrypted digital information signal is decrypted into the original digital information. In order to request that a particular identification code be included so as to allow access to a program, either one of the receivers or the recorders each generate an information request signal. The transmitter is responsive to the information request signals to add to the digital information signal at a time ahead of the digital information signal, identification signals for identifying the receivers or the recorders which generated the information request signals, thereby producing a transmission signal formed of those signals, and to distribute this transmission signal to the receivers. The recorders control the received information signal to be recorded in response to the identification signals received by the receivers.

27 Claims, 20 Drawing Sheets

| TRACK NUMBER | BLOCK NUMBER | CONTROL INFORMATION | PARITY |

# 5,719,943

DIGITAL INFORMATION SIGNAL TRANSMITTING/RECEIVING METHOD AND SYSTEM

BACKGROUND OF THE INVENTION

This invention relates to a digital information signal transmitting/receiving method and system for transmitting and receiving a digital information signal and which make it possible to automatically record the received digital information signal.

One example of cable television system (CATV) is disclosed in the Journal of the Institute of Television Engineers of Japan, Vol. 47, No. 4 (1993), pp. 494–499. In the CATV system, the audio signals and video programs are distributed through communication media such as radio waves and cables to homes or subscribers where the transmitted programs can then be recorded and reproduced by their receivers.

When a digital signal such as a video program is distributed in an encrypted manner through a satellite communication network as a communication medium so that only the subscribers can decrypt the encrypted signal, this system can cover a large service area of about tens of thousands to hundreds of thousands subscribers. When ones of the subscribers have requested to distribute a program signal, the program transmitting station adds the identification codes of those subscribers to the program signal, and encrypts and distributes the program signal. The receivers of those subscribers use key codes or the identification codes assigned to those subscribers in order to decrypt the received signals, respectively. The system having a large number of subscribers is sometimes required to add many identification codes of subscribers to a digital signal of one program. Therefore, the signal to be transmitted has a region provided for a large number of identification codes of subscribers in addition to the main region for the program signal. The region for the identification codes is swollen by the increase of the number of subscribers.

The program transmitting station sequentially distributes programs in accordance with the request for distributing the programs from a large number of subscribers. In this case, the digital signals are sometimes compressed in order that the transmission time can be reduced. While a certain program is being transmitted, another program, if requested from a subscriber, cannot be transmitted until the signal under transmission comes to an end. The subscriber cannot know when the desired program is transmitted. Therefore, in a case that the received program is reproduced after being once recorded by the subscriber's recorder, the transmitting station must control the subscriber's recorder to start and end its operation.

SUMMARY OF THE INVENTION

It is an object of the invention to provide a method and system for correctly and efficiently transmitting and receiving a digital signal of a program requested by subscribers, and which make it possible to automatically record the received signal.

According to one aspect of the invention, the identification codes of all subscribers who have requested for a program are simultaneously transmitted on the main data region ahead of the transmission of the primary digital information signal.

In addition, according to another aspect of the invention, when the primary digital information signal is transmitted, a start signal and an end signal are added to its head and its back, respectively.

Since the identification codes are transmitted on the main data region, the transmission rate and transmission capacity are sure to be equivalent to those of the primary digital information signal even though the number of homes which receive is increased.

Moreover, the received digital information signal is started to record according to the start signal added to its head and stopped from recording by the end signal added to its back. Therefore, the automatic recording becomes possible, and thus the user does not fail to record.

In addition, according to another aspect of the invention, there is provided a digital information recording system which has a transmitter for transmitting the digital information signal, a receiver for receiving the transmitted digital information signal from the transmitter and a recorder for recording the received digital information signal at the receiver. In this digital information signal recording system, an information request signal is generated from either the receiver or the recorder. The transmitter is responsive to the information request signal to generate an identification signal for identifying the receiver or recorder which has produced the information request signal and to add it to the digital information signal, thus generating a transmission signal including those signals. This transmission signal is transmitted to the receiver. The recorder controls the received information signal to be recorded on the basis of the identification signal received by the receiver.

According to this invention, it is possible to provide a digital information transmitting/receiving and recording/reproducing method and system capable of simultaneously transmitting a large number of identification codes for tens of thousands to hundreds of thousands of homes and simultaneously receiving or recording/reproducing them at the subscribers.

Furthermore, according to this invention, since the transmitter transmits each information plus the identification signal of the user who has requested for that signal, the identification signal is detected by the corresponding subscriber's identification signal detection means, so that the user can find that the transmitted information is the requested one. Therefore, if the recorder is started to record at this point, necessary information can be recorded. Also, since the other information which the user does not request for has different identification signals from the corresponding user's one, it can be prevented from being recorded by mistake.

DESCRIPTION OF THE PREFERRED EMBODIMENTS

Figure 1:
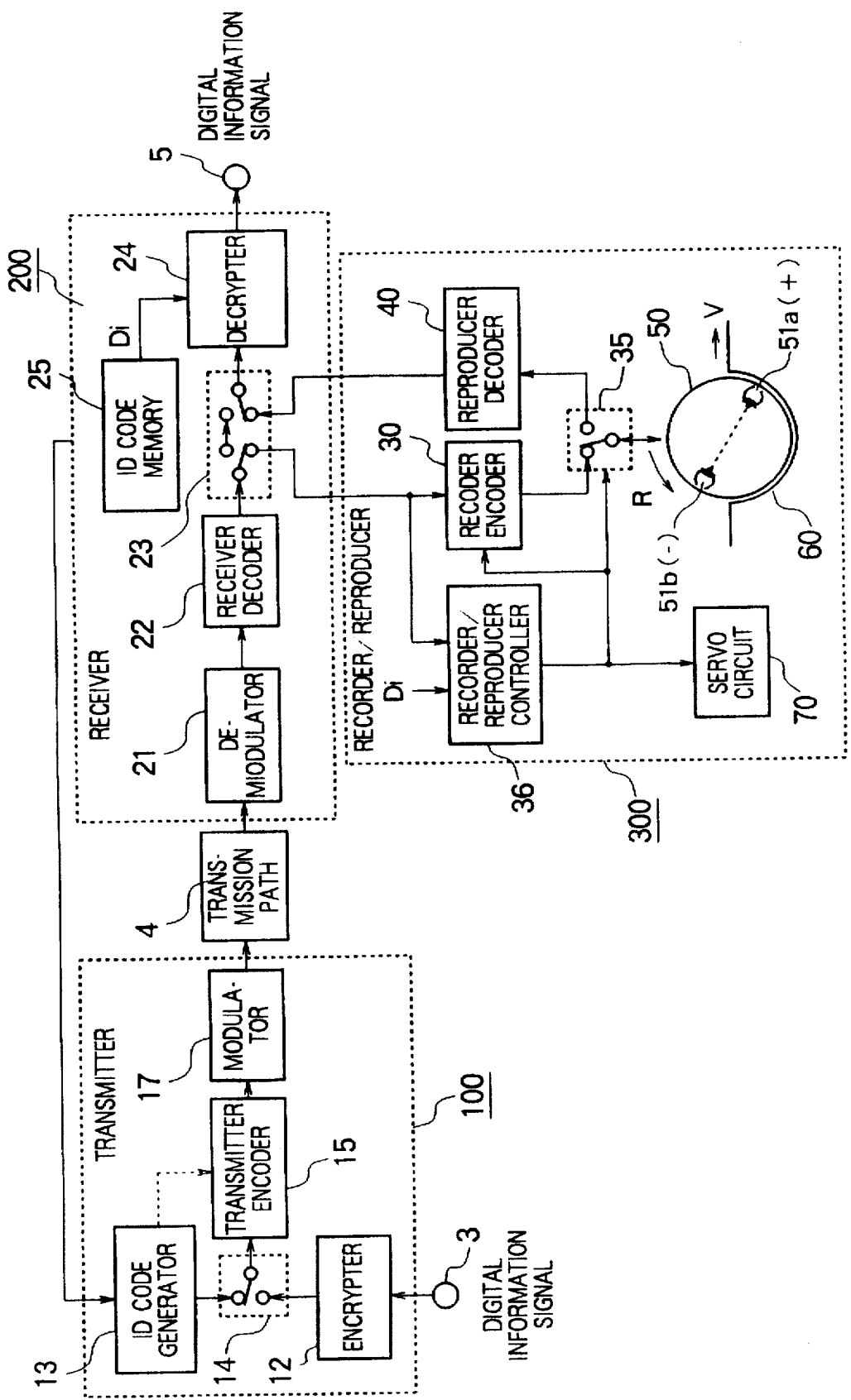
FIG. 1 is a block diagram of one embodiment of a digital information signal transmitting/receiving system of the invention.

FIG. 1 is a block diagram of one embodiment of a digital information transmitting/receiving and recording/reproducing method and system according to this invention. This system can be roughly divided into a transmitter 100, a receiver 200 and a recorder/reproducer 300. The transmitter 100 includes an encrypter 12, an identification code generator 13, a change-over switch 14, a transmitter-encoder 15 and a modulator 17. The receiver 200 includes a demodulator 21, a receiver-decoder 22, a change-over switch 23, a decrypter 24 and an identification code memory 25. The recorder/reproducer 300 includes a recorder-encoder 30, a change-over switch 35, a recorder/reproducer controller 36, a reproducer-decoder 40, a rotating drum 50, magnetic heads 51a, 51b, a magnetic tape 60 and a servo circuit 70. Shown at 3 is an input terminal, 4 a transmission path, and 5 an output terminal. The receiver 200 and the recorder/reproducer 300 may be combined into a unit. The number of pairs of the receiver 200 and the recorder/reproducer 300 to be provided corresponds to that of the subscribers.

The operation of the transmitter 100 will be first described. A digital information signal (program) supplied through the input terminal 3 in accordance with a subscriber's request for the program is encrypted by the encrypter 12. The identification code generator 13 generates an identification code such as a key code and subscriber's number in order that only the subscriber who made the request can decrypt the program. The encrypted digital information signal and the identification code are switched by the change-over switch 14. The selected one is encoded into a predetermined format by the transmitter-encoder 15. The encoded digital information signal and identification code are sequentially modulated by the modulator 17 and fed to the transmission path 4. In FIG. 1, the request for program is transmitted through another one different from the transmission path 4. However, the request for program may be transmitted through the same transmission path 4 as for the digital information signal. The program request signal may be generated from either the receiver 200 or the recorder/reproducer 300.

Figure 2:
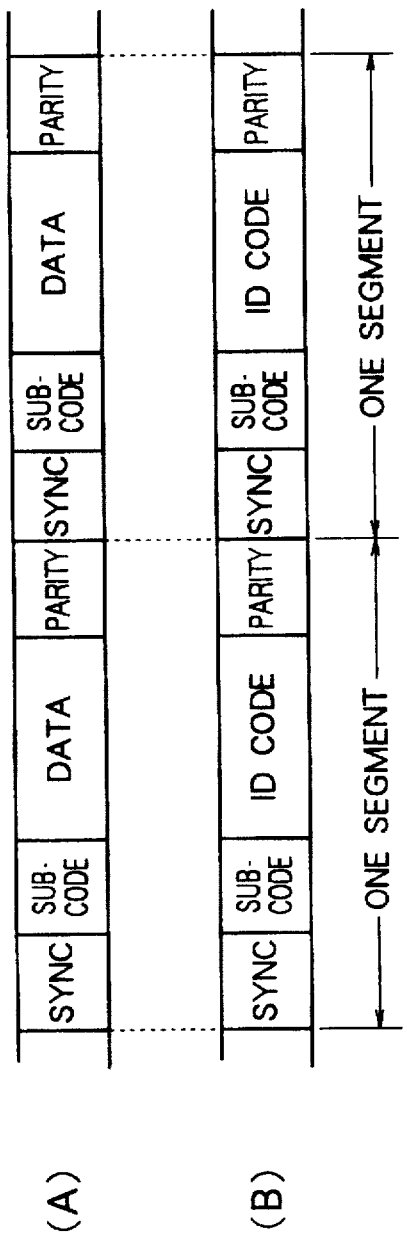
FIG. 2 shows one example of the format of the transmission signal including main data and identification codes.

In FIG. 2, (A) and (B) show examples of the formats for the digital information signal and identification code encoded by the transmitter-encoder 15, respectively. The format of the encoded digital information signal shown in FIG. 2, (A) is formed of segments each of which includes a synchronizing signal (SYNC), a subcode, data (digital information signal) and a parity. In this subcode are inserted controls signals to the recorder/reproducer 300, for example, an REC start signal and an REC end signal, which will be mentioned later.

Figure 3:
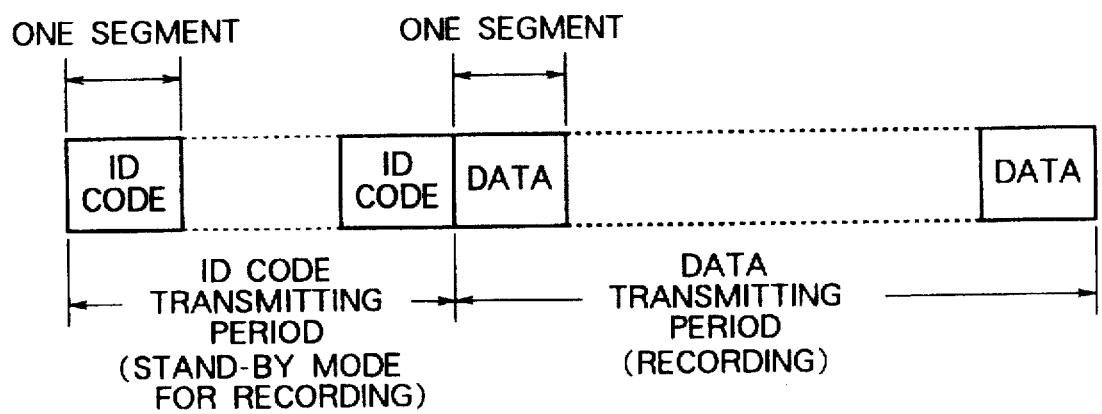
FIG. 3 shows the signal format for simultaneously transmitting a plurality of identification codes ahead of the main data.

According to the conventional digital information signal transmission system, the identification codes to be transmitted are inserted in the subcode region of this format. However, the transmission capacity of this subcode is too small to be used in a large-scale subscriber system. Thus, according to this invention, as shown in FIG. 2, (B), the identification codes to be transmitted are inserted in the main data region. In addition, as shown in FIG. 3, the encoded identification codes are transmitted ahead of the digital information signal. Also, the recorder/reproducer 300 which will be mentioned later is set in the recording-standby mode during this identification code transmission period, and then automatically operated to record the transmitted digital information signal.

In the receiver 200, the signal received through the transmission path 4 is demodulated by the demodulator 21. The identification codes and digital information signal of the demodulated signal are sequentially decoded by the receiver-decoder 22. The decoded identification codes and digital information signal are supplied through the change-over switch 23 to the decrypter 24. The decrypter 24 collates the transmitted identification codes with its own identification code Di from the identification code memory 25 and decrypts the digital information signal for which the subscriber requested. The decrypted digital information signal is produced at the output terminal 5.

Since the identification codes are inserted in the large-capacity main data region and transmitted ahead of the digital information signal, this construction can be used for a large-scale subscriber system. In addition, since each segment of the format for transmitting the identification signal is the same as that of the primary format for next transmitting the digital information signal, there is an advantage that the transmitter-encoder 15 and the receiver-decoder 22 can be simplified in their arrangements.

A description will be made of the operation for recording and reproducing the digital information signal for which the subscriber requested.

The identification codes and digital information signal sequentially decoded by the receiver-decoder 22 are supplied through the change-over switch 23 to the recorder/reproducer 300. The recorder/reproducer controller 36 first collates the transmitted identification codes with its own identification code Di so that it is decided whether or not the next transmitted digital information signal has been requested for. As a result, if it has been requested for, the recorder/reproducer 36 further controls the recorder-encoder 30, change-over switch 35 and servo circuit 70 to be set in the recording-standby mode. After the following REC start signal is received, the controller sets those elements in the recording mode. The digital information signal for which the subscriber has requested for is supplied to the recorder-encoder 30 and started to be recorded.

Figure 4:
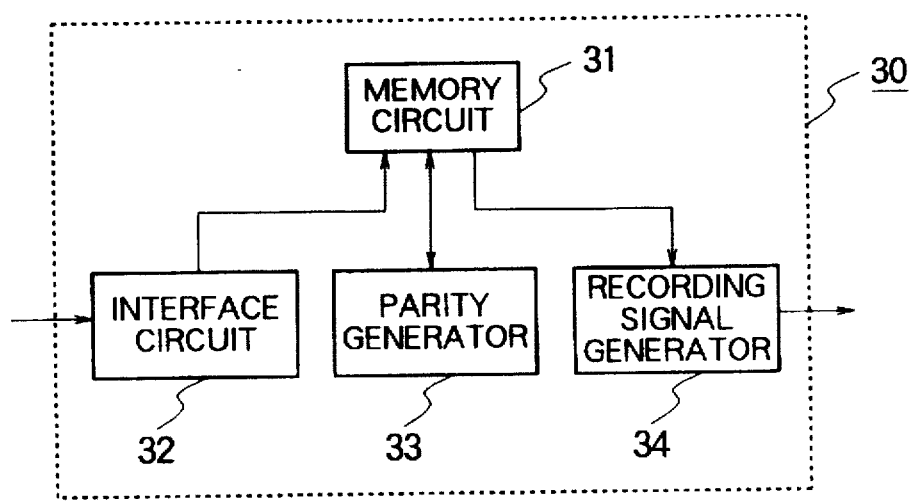
FIG. 4 is a block diagram of one example of a recorder-encoder.
Figure 5:
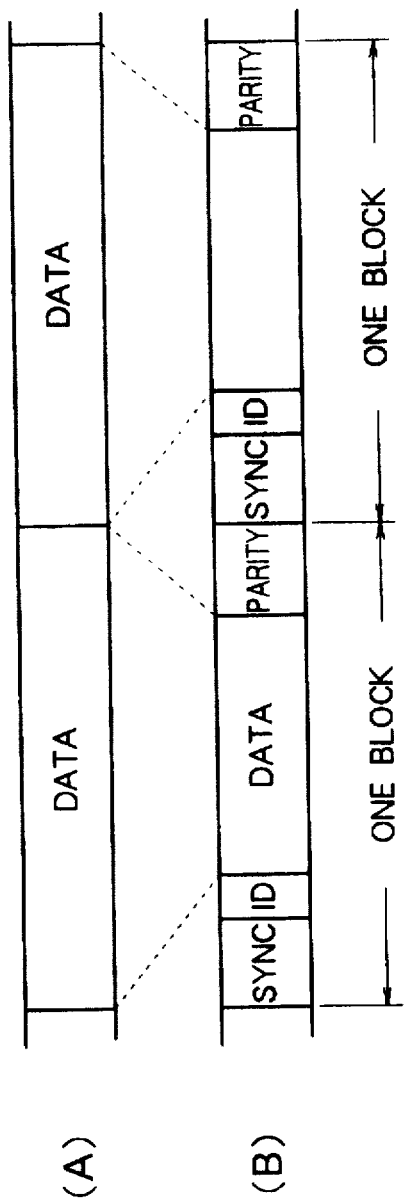
FIG. 5 shows one example of the data format within the recorder-encoder.

The recorder-encoder 30 encodes the fed signal into a format suitable for recording and reproduction. FIG. 4 is a block diagram of one example of the construction of this recorder-encoder 30. That is, the recorder-encoder 30 includes a memory 31, an interface circuit 32, a parity generator 33 and a recording signal generator 34. The transmitted digital information signal (data) is fed through the interface circuit 32 to the memory 31 where it is stored. FIG. 5, (A) shows the data. The parity generator 33 generates a parity from the data stored in the memory 31 and supplies it to the memory 31 where it is stored. The recording signal generator 34 reads the data and parity from the memory 31, adds the synchronizing signal (SYNC) and ID (identification) signal to them, and produces the mixture as a block-type signal as shown in FIG. 5, (B).

Figures 6, 7:
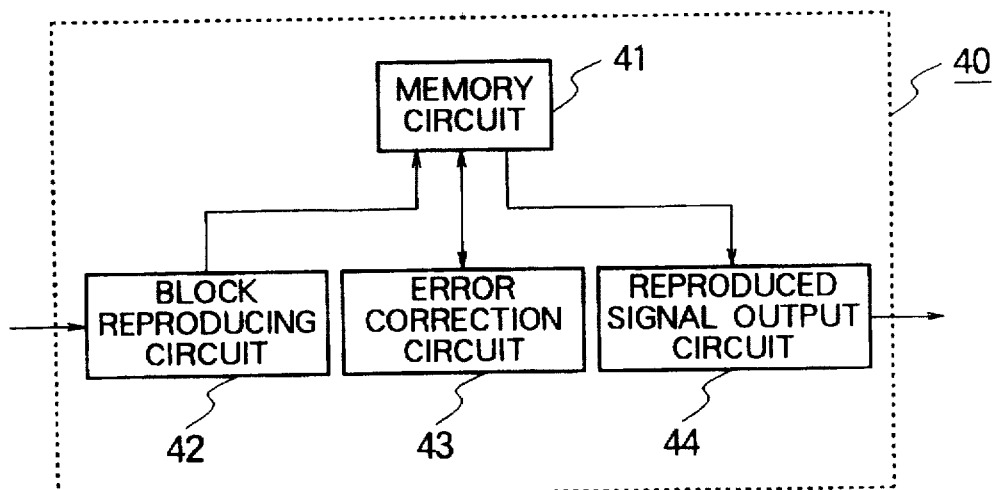
FIG. 6 shows one example of the format of the ID (identification) signal.
FIG. 7 is a block diagram of one example of a reproducer-decoder.

FIG. 6 shows one example of the format of the ID signal. It is formed of, for example, a track number for identifying (indicating) a recorded track on the magnetic tape 60, a block number for indicating the position within the track, control information such as the recording time and a program number on the tape, and a parity for detecting and correcting the error of ID signal. The sent own identification code is also inserted in this control information.

The signal from the recorder-encoder 30 is supplied through the change-over switch 35 to the magnetic heads 51a, 51b which are mounted on the rotating drum 50 to be spaced by 180 degrees from each other. The magnetic heads scan the magnetic tape 60, thus recording it thereon with different azimuth angles. At this time, the servo circuit 70 controls the rotating drum 50 to rotate at a speed of R, and the magnetic tape 60 to be transported at a speed of V. The plus (+) and minus (−) signs attached to the reference numerals 51a, 51b of the magnetic heads indicate positive azimuth and negative azimuth, respectively.

The recording mode is stopped by the received REC end signal in the same way as it was started. Since all the control operations of the recorder/reproducer 300 are based on the received signals from the transmitter 100, the users can enjoy the automatic recording of desired soft without touching the recorder/reproducer. In addition, since the transmitter side is able to transmit the identification codes at a time, a large number of subscribers can simultaneously enjoy the automatic recording.

The signal reproduced by the heads 51a, 51b is fed through the change-over switch 35 to the reproducer-decoder 40 by which it is decoded. FIG. 7 is a block diagram of one example of the arrangement of this reproducer-decoder 40. That is, the reproducer-decoder includes a memory 41, a block reproducing circuit 42, an error correcting circuit 43 and a reproduced signal output circuit 44. Referring to FIG. 7, the signal reproduced by the magnetic heads 51a, 51b is supplied to the block reproducing circuit 42. The block reproducing circuit 42 detects the synchronizing signal and ID signal and supplies the input signal to the memory 41 where it is stored at a predetermined location according to the track number and block number of the ID signal. The error correcting circuit 43 corrects the error in the reproduced data by use of the parity stored in the memory 41 and supplies the corrected data to the memory 41 where it is stored. The reproduced signal output circuit 44 reads the corrected data from the memory 41 in accordance with the order of the track number and block number and produces it at its output.

The data signal thus decoded is fed to the receiver 200 where it is supplied through the change-over switch 23 to the decrypter 24. The decrypter 24 decrypts the encrypted signal as previously mentioned and produces it at the output terminal 5.

This embodiment described above can be used for a large-scale subscriber system having several tens of thousands or above since the identification codes are inserted in the main data region and transmitted ahead of the digital information signal. In addition, since the recorder/reproducer 300 is made in the recording-standby mode during the identification code transmitting period, and since it is then started to make automatic recording by the REC start signal and stopped from recording by the REC end signal, the users can surely enjoy the automatic recording of the digital information signal without touching the recorder/reproducer 300.

According to this invention, the identification codes may be transmitted even during the transmission of the digital information signal. In this case, although the frequency of transmission per subscriber is low in a large-scale subscriber system, the subscriber who has requested can be more certainly identified. Moreover, since the operating state of the subscriber's recorder/reproducer is always monitored, there is an effect that it does not fail to record.

Figure 8:
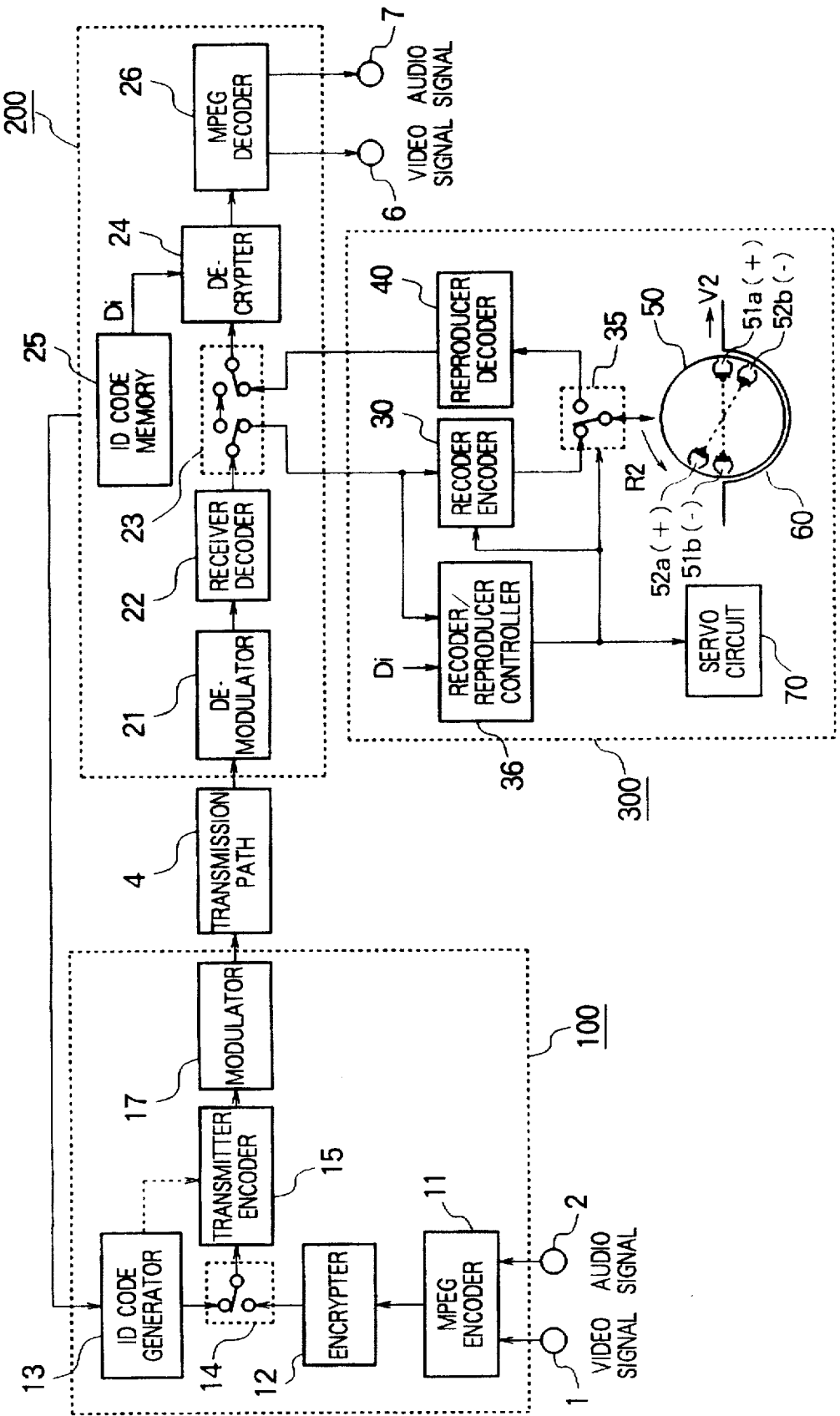
FIG. 8 is a block diagram of another embodiment of a digital information signal transmitting/receiving system of the invention.

FIG. 8 is a block diagram of another embodiment of a digital information transmitting/receiving and recording/reproducing method and system according to this invention. This system is an application of the invention to a subscriber system in which video soft is digitally compressed, encoded and distributed at high efficiency. Referring to FIG. 8, there are shown input terminals 1, 2, an MPEG encoder 11, an MPEG decoder 26, output terminals 6, 7, and magnetic heads 52a, 52b. In FIG. 8, like elements corresponding to those in FIG. 1 are identified by the same reference numerals and will not be described.

In the transmitter 100, an image signal fed through the input terminal 1 and an audio signal fed through the input terminal 2 are supplied to the MPEG encoder 11 where they are digitally compressed and encoded at high efficiency by use of, for example, MPEG (moving picture expert group) system. As is similar to the embodiment of FIG. 1, the digital information signal formed of the digitally compressed and encoded image and audio signals is encrypted by the encrypter 12, and the identification codes from the identification code generator 13 and the digital information signal are supplied through the change-over switch 14 to the transmitter-encoder 15 where they are sequentially encoded into the same formats as in FIG. 2. The encoded digital information signal and identification codes are sequentially modulated by the modulator 17 and fed to the transmission path 4. At this time, the encoded identification codes are transmitted ahead of the digital information signal, the recorder 300 is made in the recording-standby mode during the identification code transmitting period, and the next transmitted digital information signal is automatically recorded, as is similar to the operation shown in FIG. 3.

In the receiver 200, similarly, the signal received through the transmission path 4 is demodulated by the demodulator 21 and then decoded by the receiver-decoder 22. The decoded identification codes and digital information signal are supplied through the change-over switch 23 to the decrypter 24 where the requested digital information signal is decrypted. The decrypted signal is decoded by the MPEG decoder 26 into the original image and audio signals, which are produced at the output terminals 6 and 7, respectively.

The decoded identification codes and digital information signal from the receiver-decoder 22 are supplied through the change-over switch 23 to the recorder/reproducer 300. The recorder/reproducer controller 36 receives the identification codes and makes the recorder-encoder 30, change-over switch 35 and servo circuit 70 in the recording-standby mode. Then, after the REC start signal is received, the requested digital information signal is started to be automatically recorded. It is also automatically stopped from being recorded by the received REC end signal.

At this time, the recorder-encoder 30 is constructed in the same way as in FIG. 4. That is, the recorder-encoder encodes the identification codes and digital information signal into the block-type format suitable for recording and reproduction, as is similar to the format shown in FIG. 5B. As a result, it produces recording signals on two channels, which are then fed through the change-over switches 35 to two pairs of magnetic heads 51a, 52b and 51b, 52a so that they are recorded at different azimuth angles on the magnetic tape 60. At this time, the servo circuit 70 controls the rotating drum 50 to rotate at a speed of R2 and the magnetic tape 60 to be transported at a speed of V2. The plus (+) and minus (−) signs attached to the reference numerals 51a, 52b and 51b, 52a of the magnetic heads indicate positive azimuth and negative azimuth, respectively.

The reproducer-decoder 40 is constructed in the same way as in FIG. 7, and decodes the signals reproduced by the magnetic heads 51a, 52b and 51b, 52a. The decoded signals are supplied to the receiver 200, where they are fed through the change-over switch 23 to the decrypter 24. The decrypter 24 operates in the above-mentioned way to decrypt the signals. The decrypted signals are decoded by the MPEG decoder 26 into the image and audio signals, which are then produced at the output terminals 6 and 7, respectively.

Since this embodiment is also constructed to insert the identification codes in the main data region and transmit it ahead of the digital information signal, it can be applied to a large-scale subscriber system of over tens of thousands of homes. In addition, since the recorder/reproducer 300 is made in the recording-standby mode during the identification code transmitting period and controlled to start and stop automatic recording by the REC start signal and REC end signal, respectively, the users can surely record the video soft for which the users have requested without touching the recorder/reproducer 300.

Figure 9:
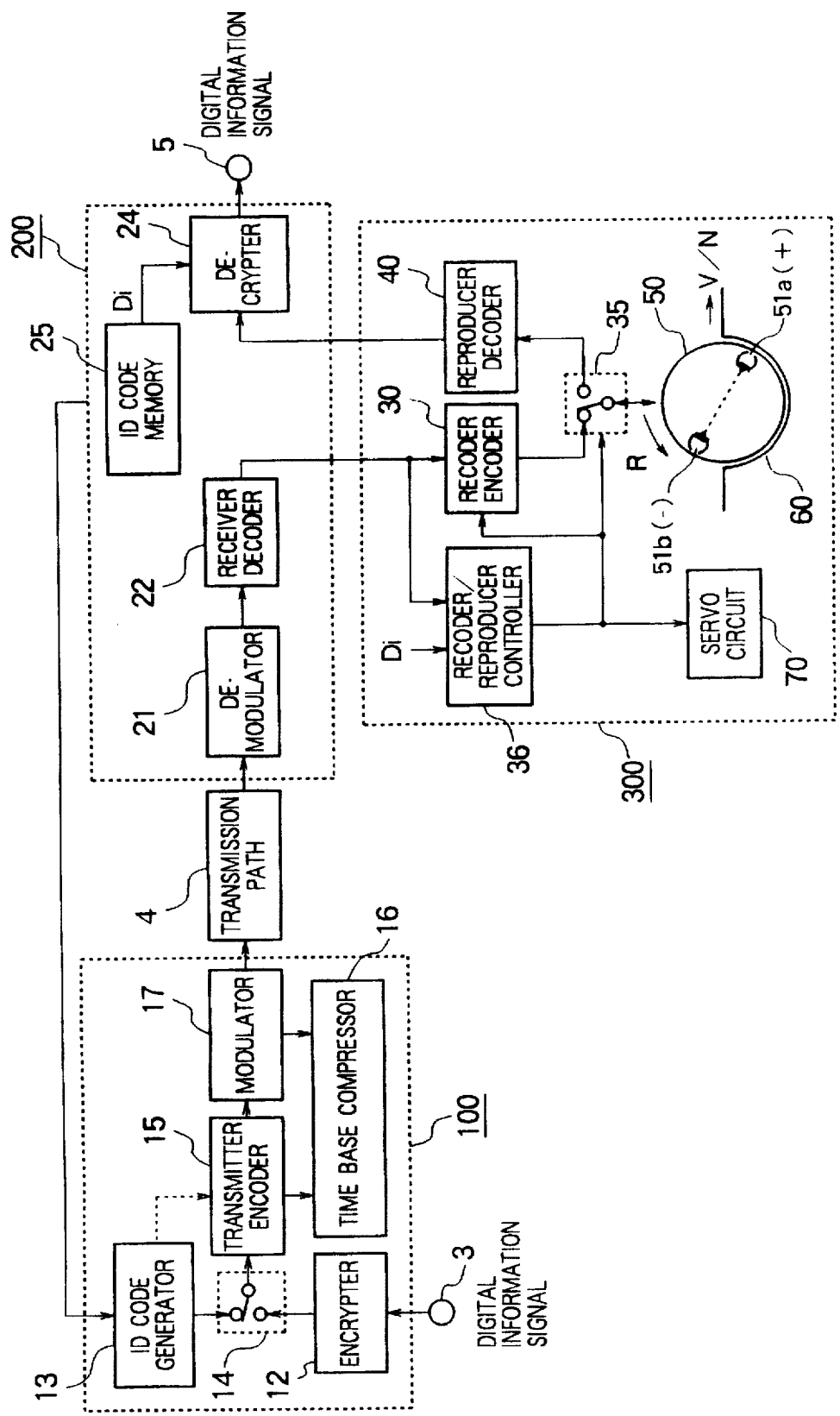
FIG. 9 is a block diagram of still another embodiment of a digital information signal transmitting/receiving system of the invention.

FIG. 9 is a block diagram of another embodiment of a digital information transmitting/receiving and recording/reproducing method and system according to the invention. This embodiment is an application of the invention to a system for compressing the time base of a digital information signal, transmitting and recording it at high speed and reproducing it at the original speed. In FIG. 9, reference numeral 16 represents a time-base compressor, and like elements corresponding to those in FIG. 1 are identified by the same reference numerals and will not be described.

In the transmitter 100, the digital information signal fed through the input terminal 3 is encrypted by the encrypter 12. The digital information signal from the encrypter and the identification codes from the identification code generator 13 are switched by the change-over switch 14. The signals passed through the change-over switch are sequentially encoded by the transmitter-encoder 15 into the same formats as in FIG. 2. The encoded digital information signal and identification codes are compressed in their time base into 1/N (N is an integer of 2 or above) by the time-base compressor 16. As a result, their transmission rate is increased N times. The compressed digital information signal and identification codes are modulated by the modulator 17 and fed to the transmission path 4. At this time, the encoded identification codes are transmitted ahead of the digital information signal, the recorder/reproducer 300 is made in the recording-standby mode during the identification code transmitting period, and the next transmitted digital information signal is automatically recorded, as is similar to the operation shown in FIG. 3.

In the receiver 200, the signals passed through the transmission path 4 and received are demodulated by the demodulator 21 and decoded by the receiver-decoder 22. The decoded identification codes and digital information signal are fed to the recorder/reproducer 300.

The recorder/reproducer 300 receives the decoded identification codes and digital information signal from the receiver-decoder 22. First, when receiving the identification codes, the recorder/reproducer controller 36 makes the recorder-encoder 30, change-over switch 35 and servo circuit 70 in the recording-standby mode. Then, the requested digital information signal is automatically started to be recorded by the REC start signal and stopped from recording by the REC end signal.

At this time, the recorder-encoder 30 is constructed in the same way as in FIG. 4. That is, the encoder encodes the input signal into the same block-type format as shown in FIG. 5B, which is suitable to be recorded and reproduced. The encoded signal is supplied through the change-over switch 35 to the magnetic heads 51a, 51b and recorded at different azimuth angles on the magnetic tape 60. At this time, the servo circuit 70 controls the rotating drum 50 to rotate at a speed of R and the magnetic tape 60 to be transported at a speed of V.

Figure 10:
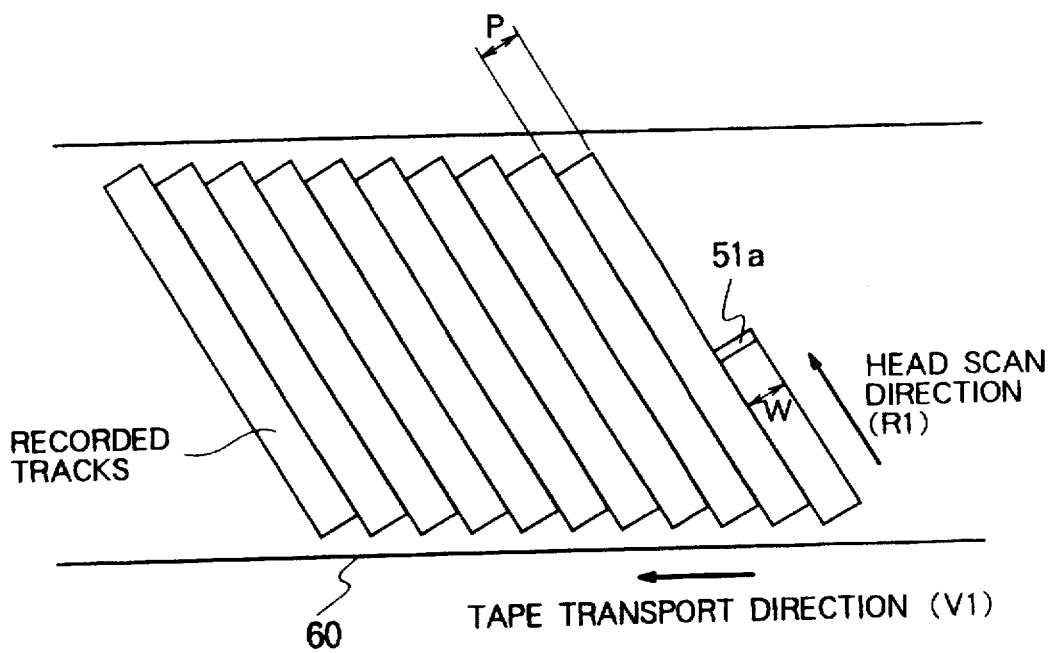
FIG. 10 shows a track pattern recorded on a magnetic tape.

FIG. 10 shows a track pattern recorded at different azimuth angles. In FIG. 10, R1 and V1 are the speeds of the rotation drum 50 and magnetic tape 60, as on the general video tape recorder, which are controlled by the servo circuit 70, P is the track pitch and W is the head width of the magnetic heads 51a, 51b. In this embodiment, the head width W is larger than the track pitch P, for example, 1.5 times larger.

At the time of reproduction, the servo circuit 70 controls the rotating drum 50 to rotate at the same speed R as at the time of recording, and the magnetic tape 60 to be transported at 1/N as low as the speed V at the time of recording, or at V/N. The recorded signals on the tape are reproduced by the magnetic heads 51a, 51b.

Figure 11:
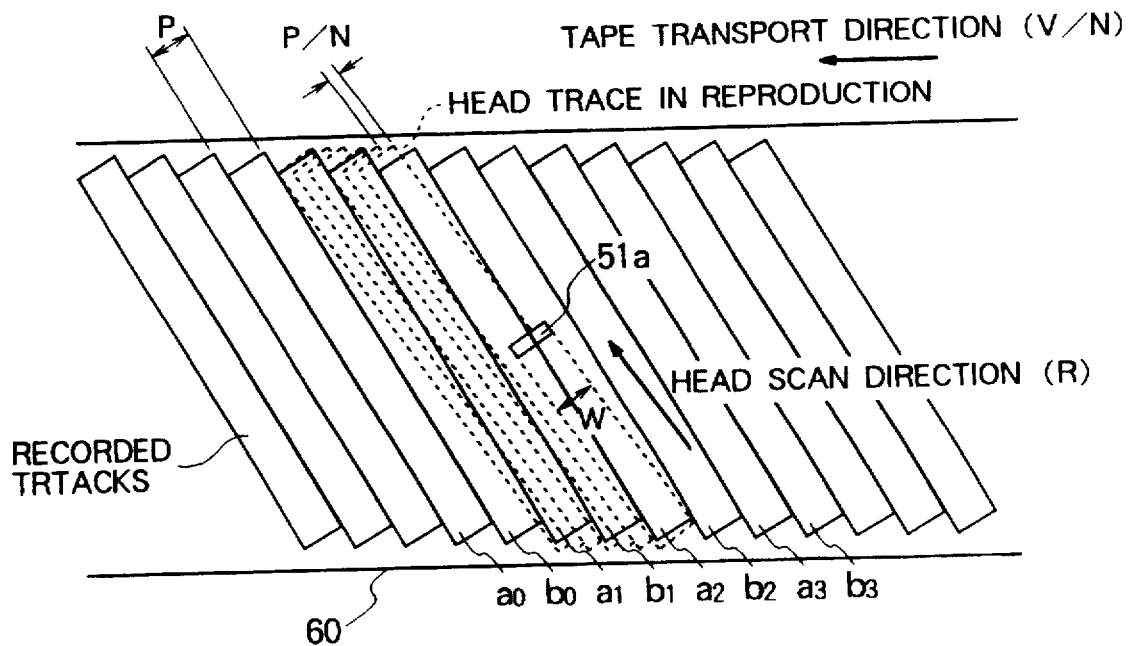
FIG. 11 is a diagram to which reference is made in explaining the operation for tracing the recorded track on the magnetic tape by magnetic heads to thereby reproduce the signal.

FIG. 11 shows track patterns in this reproduction mode. The solid lines indicate the recorded track pattern, and the broken lines indicate the tracks along which the magnetic heads 51a, 51b scan. Since the rotating drum 50 is rotated at the same speed R as at the time of recording and the magnetic tape 60 is transported at 1/N as low as the speed V at the time of recording, or at V/N, the scanning pitch of the magnetic heads 51a, 51b is 1/N the track pitch P and the scanning angle corresponds to about N-times scanning per track although it depends on the value of N. W is the head width of the magnetic heads 51a, 51b. In FIG. 11, N is 3.

Figure 12:
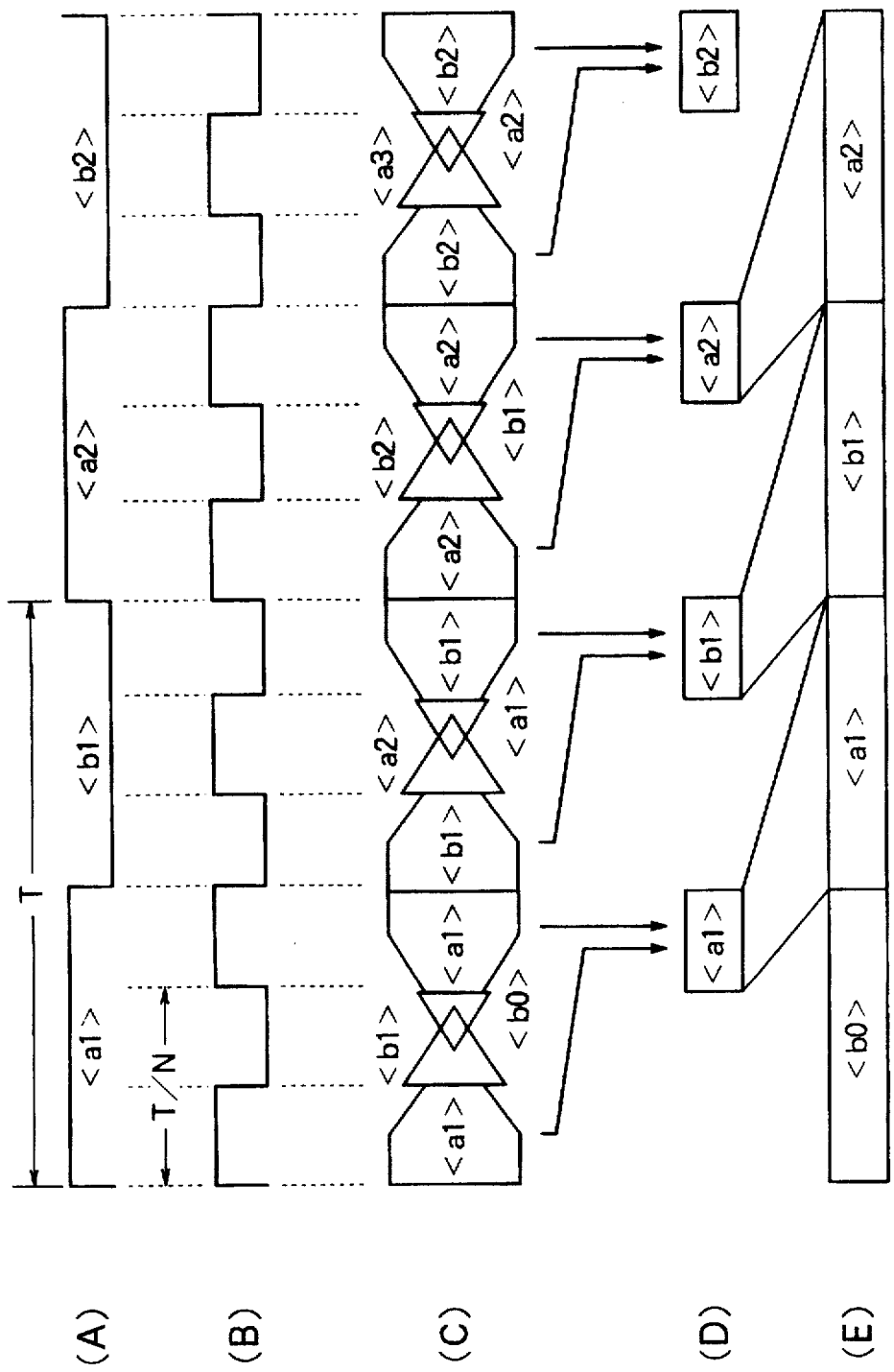
FIG. 12 is a waveform diagram to which reference is made in explaining the operation for extracting desired data from the signal which has been reproduced by tracing the recorded track.

FIG. 12 is a waveform diagram showing the process in which signals are reproduced during this N (for example, N=3)-times scanning. In FIG. 12, the waveform at (A) shows the rotation timing of the drum 50 which is rotated at R/N. At this time, it is assumed that signals are reproduced in the order of $a_0$, $b_0$, $a_1$, $b_1$, $a_2$, $b_2$, $a_3$, $b_3$. T is the rotation period. The waveform shown at (B) shows the rotation timing of the drum 50 which is rotated at R, and the waveform shown at (C) shows the envelope of signals reproduced by the magnetic heads 51a, 51b at this time. Thus, since the magnetic heads 51a, 51b scan each track three times and, as described previously, have the head width W set to be 1.5 times as wide as the track pitch P, large parts of the heads can trace each track even though the scanning angle is deviated from the recorded track angle. Therefore, if the highest-output-level one of the reproduced signals from each track is selected, the original data (waveform D) can be obtained. Then, if this output is expanded three times in its time base, the desired low-speed signal (waveform E) can be obtained.

The process for selecting the high-level output from the signals produced during the above N-times scanning is performed by the reproducer-decoder 40 shown in FIG. 7. Referring to FIG. 7, the signal reproduced by the magnetic heads 51a, 51b is first supplied to the block reproducing circuit 42. This block reproducing circuit 42 detects the synchronizing signal and ID signal and supplies the input signal to the memory 41 where it is recorded at a predetermined location according to the track number and block signal of the ID signal. The error correcting circuit 43 corrects the error of the reproduced data by use of the parity stored in the memory 41 and, at the same time, generates a pointer for indicating the state of the error. This pointer is stored in the memory 41. At this time, although data of the same track number and block number is fed N times to the memory 41, the best error-state data according to the pointer is finally recorded in the memory. The reproduced signal output circuit 44 reads out the error-corrected data from the memory 41 in the order of the track number and block number and thus produces the time-base-expanded low-speed data.

The low-speed data signal from the reproducer-decoder is supplied to the receiver 200 in which it is decrypted by the decrypter 24 into the original digital information signal, which is then produced at the output terminal 5.

Since this embodiment is also constructed to insert the identification codes in the main data region and transmit it ahead of the digital information signal, it can be applied to a large-scale subscriber system of over tens of thousands of homes. In addition, since the recorder/reproducer 300 is made in the recording-standby mode during the identification code transmitting period and controlled to start and stop the automatic recording by the REC start signal and REC end signal, the users can surely record the digital information signal for which they have requested without touching the recorder/reproducer 300.

Moreover, since the rotating drum 50 in the reproduction mode is rotated at the same speed as in the recording mode, the frequency at the time of reproduction can be increased without lowering the coefficient N of time-base compression, and a desired reproduced output level can be assured. Also, the rotating drum 50 can be simply controlled to rotate. In addition, since the heads scan N times each track, data can be reproduced even if they are out of tracking, and thus it is not necessary to make the tracking control precise.

While in this embodiment the rotating drum 50 in the reproduction mode is rotated at the same speed as in the recording mode, the rotating drum in the reproduction mode may be rotated at 1/N as low as the normal recording speed. In this case, the magnetic heads in the reproduction mode scan in just the same way as in the recording mode, and thus the reproducer-decoder 40 can easily process the reproduced signal. However, the reproduction frequency is decreased with the increase of the coefficient N of time base compression and hence the reproduced output level is reduced. Therefore, the value of N cannot be selected to be so large.

According to this invention, in a large-scale subscriber system for distributing an encrypted digital information signal through a satellite, a large number of subscribers who requested for it can receive it at a time, and if the digital information signal is recorded and reproduced, it can be automatically recorded and thus it can be certainly recorded without failure.

Figure 13:
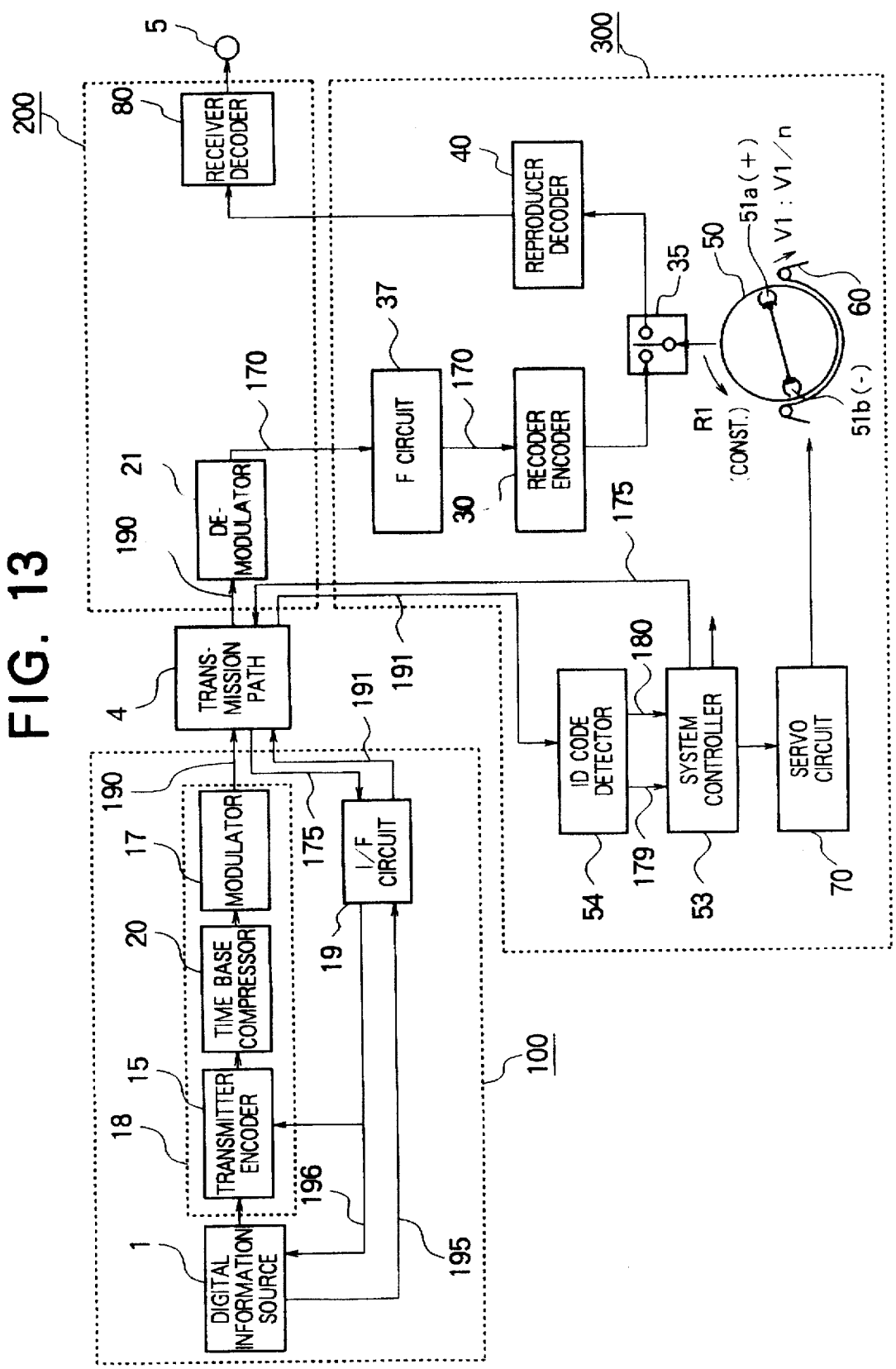
FIG. 13 is a block diagram of still another embodiment of a digital information signal transmitting/receiving system of the invention.

Another embodiment of this invention will be described with reference to FIG. 13. In FIG. 13, like elements corresponding to those in the previously mentioned embodiments are identified by the same reference numerals. FIG. 13 is a block diagram of another embodiment of a digital information recording system according to this invention. Referring to FIG. 13, there are shown the transmitter 100, the receiver 200, the recorder 300, a digital information signal source 1, the output terminal 5, the transmitter-encoder 15, an interface (I/F) circuit 19, a transmitter-processor 18, a time-base compressor 20, the modulator 17, and the transmission path 4. There are also shown an interface circuit 37, the demodulator 21, the recorder-encoder 30, the change-over switch 35, the rotating drum 50, the magnetic heads 51a, 51b, the servo circuit 70, a system control circuit 53, an identification signal detector 54, the magnetic tape 60, the reproducer/decoder 40, and a receiver-decoder 80. The positive (+) sign and negative sign (−) attached to the reference numerals 51a, 51b of the heads indicate positive azimuth and negative azimuth, respectively.

In FIG. 13, the transmitter 100 chiefly includes the digital information signal source 1, the interface circuit 19 and the transmitter-processor 18. The transmitter-processor 18 has the transmitter-encoder 15, the time-base compressor 20 and the modulator 17. The transmission path 4 may be, for example, a telephone network, a wire communication network or a satellite communication network for a compressed digital information signal channel 190 and a telephone network for an identification number channel 191.

In the transmitter 100, when a request signal 175 is supplied to the interface circuit 19, the digital information signal (program) is read from the digital information signal source 1. The transmitter-encoder 15 encodes the digital information signal into a predetermined format, which is then compressed in its time base to an extent of 1/N by the time-base compressor 20 so that the transmission rate is increased N times. In addition, the transmission rate increased digital information signal is modulated by the modulator 17 and fed to the transmission path 4. At this time, since the modulated signal is distributed to a plurality of receiver/recorder units, the identification number 191 of the user who requested for each soft is added to the head of the soft in order to identify the user before the modulated signal is distributed.

The signal fed through the transmission path 4 is received by the receiver 200 and demodulated by the demodulator 21. The demodulated signal is fed to the recorder 300, where the signal which is still left in the encoded state in which it was made by the transmitter is supplied through the interface circuit 37 to the recorder-encoder 30. The recorder-encoder 30 encodes it into a format suitable for recording and reproduction.

Figure 14:
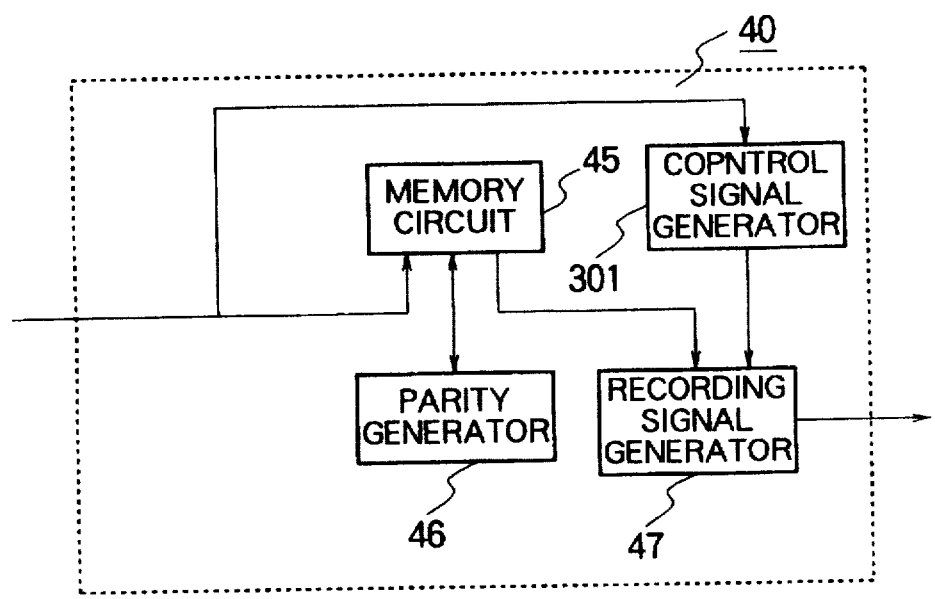
FIG. 14 is a block diagram of one example of the reproducer-decoder in the digital information signal transmitting/receiving system of the invention shown in FIG. 13.

FIG. 14 is a block diagram of a concrete example of the recorder-encoder 30. Referring to FIG. 14, there are shown a memory 45, a parity generator 46, a recording signal generator 47 and a control information generator 301.

In FIG. 14, the demodulated data (FIG. 5, (A)) from the demodulator 21 (FIG. 13) of the receiver 200 is supplied through the interface circuit 37 to the memory 45 where it is stored. The parity generator 46 generates a parity from this demodulated data, and again supplies it to the memory 45 where it is stored. The recording signal generator 47 reads the demodulated data and parity from the memory 45, adds to them an ID signal and synchronizing signal of control information which is generated from the control information generator 301, and then produces the mixture as a block-type signal as shown in FIG. 5, (B). The format of the ID signal is the same as in FIG. 6, and thus will not be described.

The encoded signal from the recorder-encoder 30 is supplied through the change-over switch 35 to the magnetic heads 51a, 51b which are mounted on the rotating drum 50 to be spaced 180 degrees from each other, as shown in FIG. 13, and it is recorded on the magnetic tape 60 at different azimuth angles. FIG. 10 shows the recorded track pattern. The control for the rotation of the rotating drum 50 and transport of the magnetic tape 60 and the recorded track pattern are the same as mentioned with reference to FIGS. 10 and 11.

Figure 15:
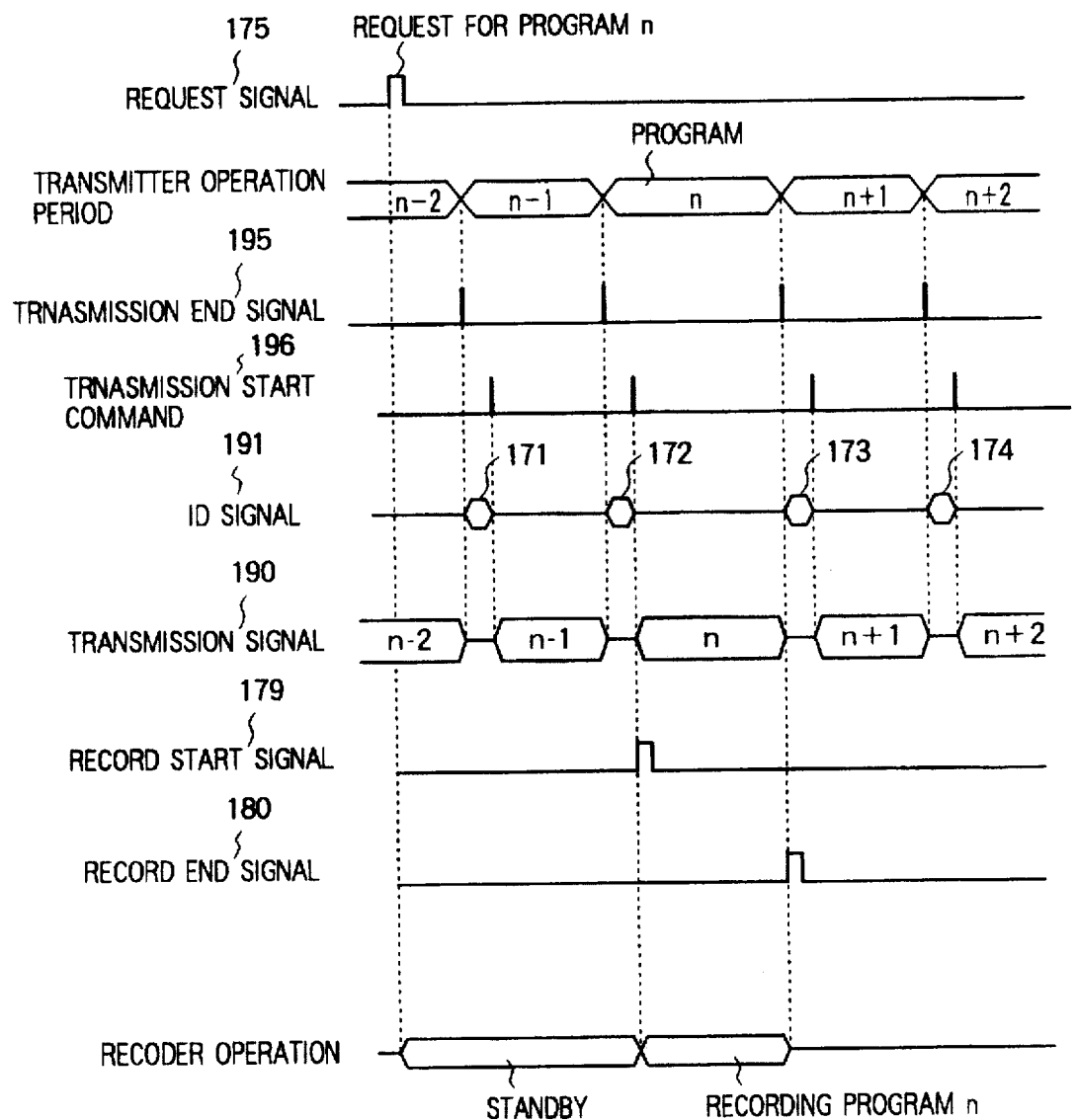
FIG. 15 is a waveform timing chart to which reference is made in explaining the operation of the digital information signal transmitting/receiving system shown in FIG. 13.

FIG. 15 is a timing chart showing the recording operation of the recorder 300 shown in FIG. 13.

At the start of recording, the system control circuit 53 supplies the request signal 175 for requesting a program n (n indicates the program identifying number and is an arbitrary integer), as shown in FIG. 15, through the transmission path 4 to the interface circuit 19 of the transmitter 100.

When the request signal 175 is fed to the transmitter 100, the transmitter 100, which distributes signals to a plurality of receiver/recorder units, may be in the process of distributing other programs, and thus it does not always start the transmission of program n at once. Therefore, it is necessary that the transmitter 100 control the recorder 300 to start and stop recording.

Thus, when the program (n−1) has been completely distributed, the transmitter 100 makes the digital information signal source 1 generate a transmission end signal 195 and supply it to the interface circuit 19. The interface circuit 19 transmits an identification signal 172 of the subscriber who requested the program n through the transmission path 4 to the identification signal detector 54 of the recorder 300.

In the recorder 300, when the identification signal detector 54 detects its own identification signal 172 from the received identification signals, it supplies a recording start signal 179 to the system control circuit 53, so that the recorder 300 starts the recording operation. In addition, the interface circuit 19, after transmitting the identification signal 172, sends a transmission start command 196 to the digital information signal source 1, causing it to start transmitting the program n. Thus, the recorder 300 can start recording the program n.

Then, after the transmitter 100 has completely distributed the program n, an identification signal 173 different from the identification signal 172 is transmitted to identify the subscriber who requested the next program (n+1) to be distributed. When the identification signal detector 54 of the recorder 300 detects this identification signal 173, it supplies a recording end signal 180 to the system control circuit 53, so that the recorder 300 is stopped from recording.

Accordingly, the identification signal 191 transmitted from the transmitter 100 makes it possible to surely record only the requested program. The identification signal detector 54 can prevent the non-requested programs from being recorded by mistake unless it produces the recording start signal 179 when supplied with the identification signals 171, 173, 174 other than its own identification signal.

Figure 16:
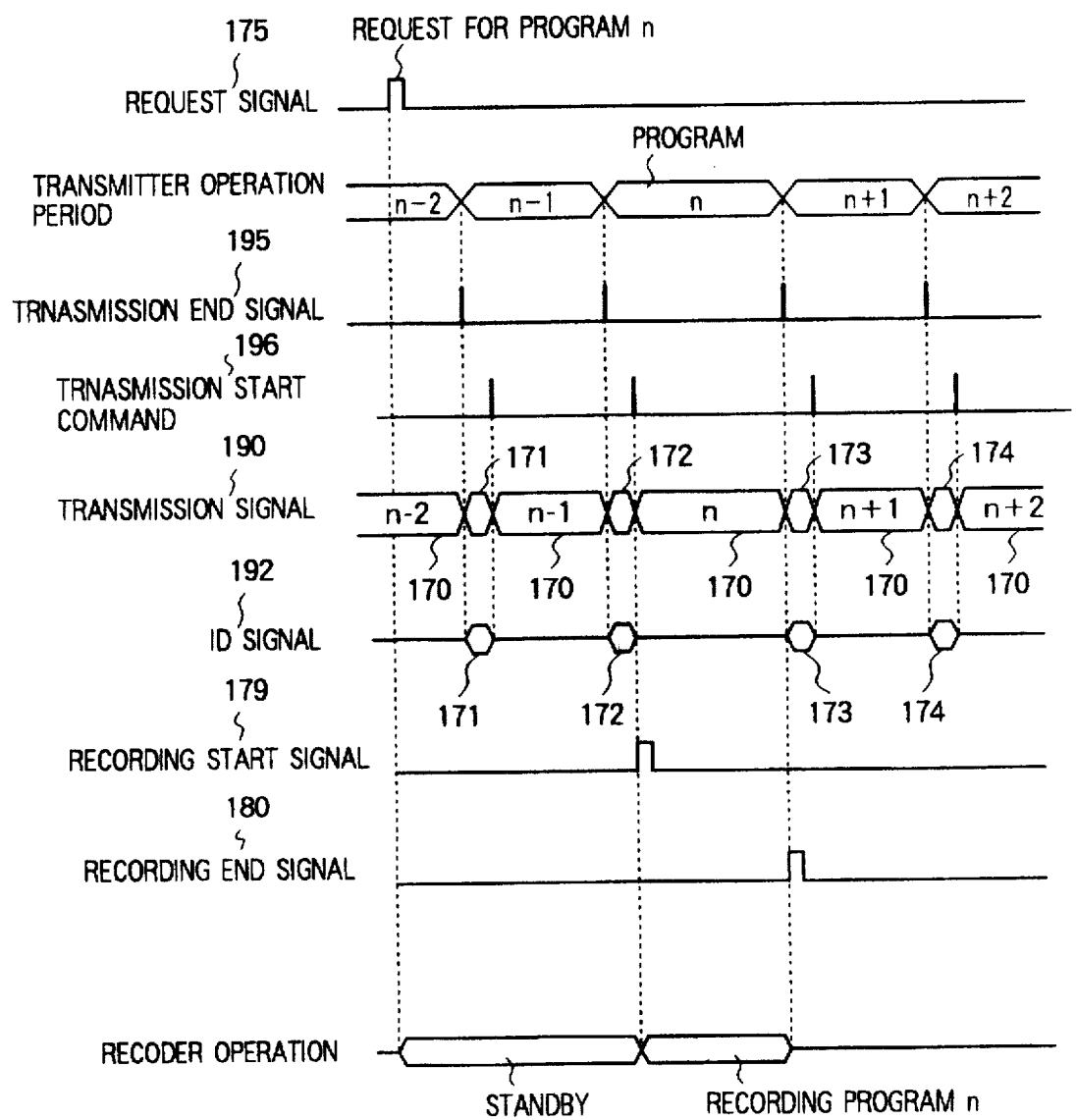
FIG. 16 is a waveform timing chart to which reference is made in explaining another operation of the digital information signal transmitting/receiving system shown in FIG. 13.
Figure 17:
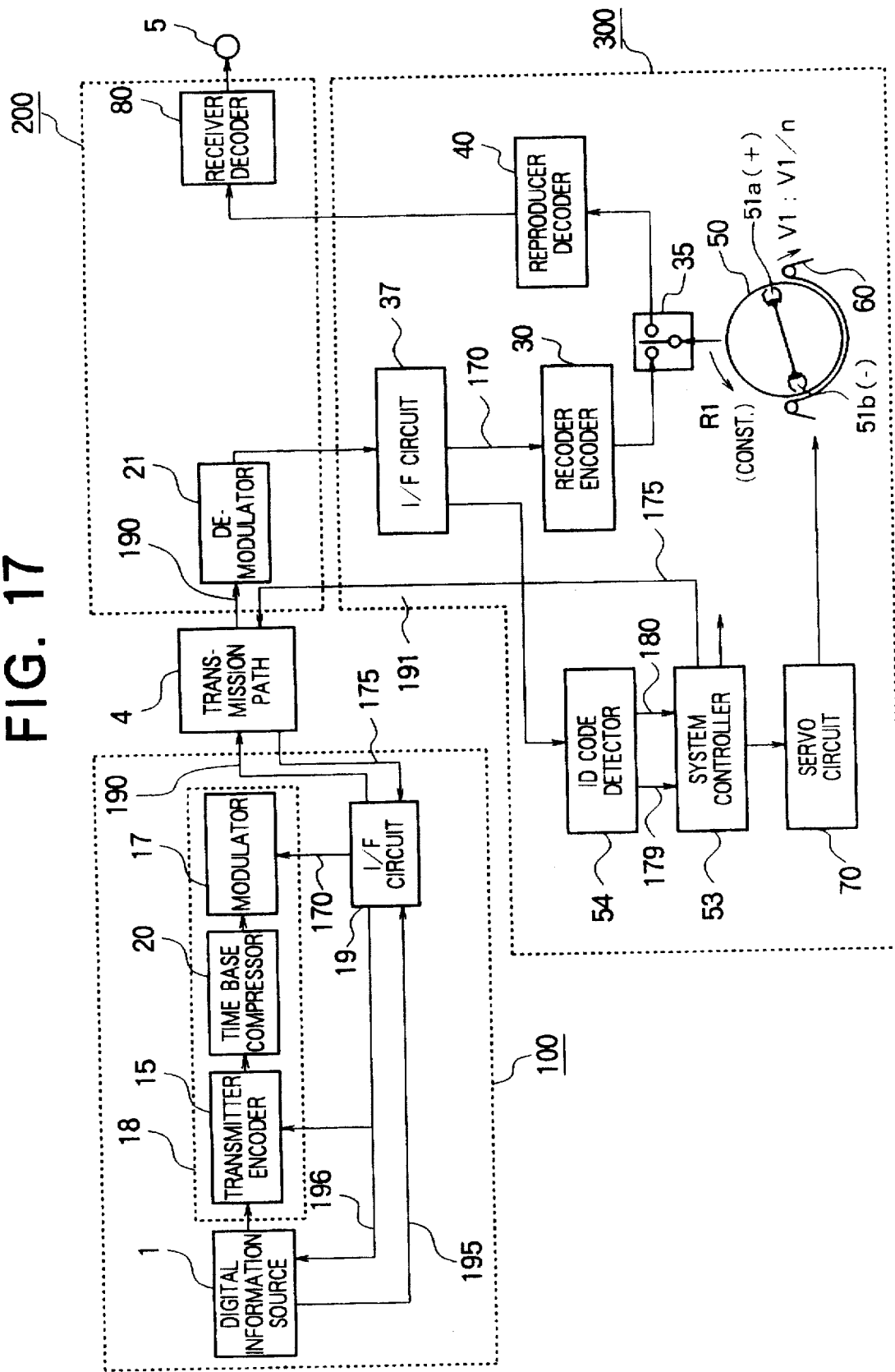
FIG. 17 is a block diagram of still another embodiment of a digital information signal transmitting/receiving system of the invention.

While the identification signal 191 and the digital information signal 170 are separately transmitted via different channels as described above, they may be multiplexed, or transmitted as a single signal, through a common channel. FIG. 16 is a timing chart showing the recording operation in such case. FIG. 17 is a block diagram of still another embodiment of a digital information recording system of the invention which makes such communication. In FIG. 17, like elements corresponding to those in FIG. 13 are identified by the same reference numerals.

As illustrated in FIG. 17, this embodiment acts to multiplex the digital information (program) signal 170 with the corresponding identification signals 171 to 174 via the common channel 190. The interface circuit 37 of the recorder 300 separates the multiplex signal into the digital information signal 170 and the identification signals 192. The identification signals 192 are fed to the identification signal detector 54 which makes the same operation as in FIG. 15, so that only the program n can be certainly recorded. Use of the multiplex signal can omit the channel 191 and simplify the interface circuits between the transmitter 100, the receiver 200 and the recorder 300.

Figure 18:
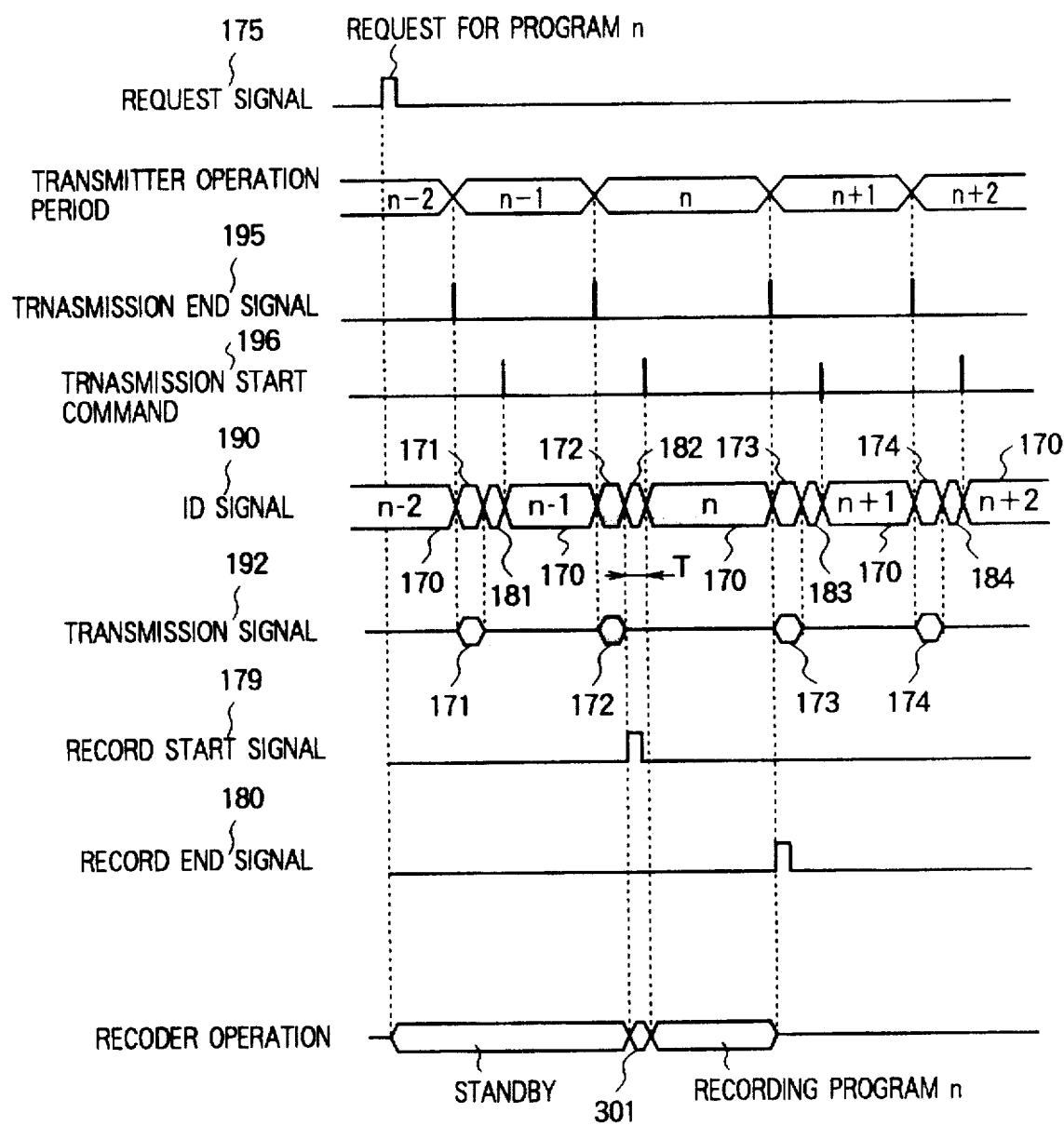
FIG. 18 is a waveform timing chart to which reference is made in explaining the operation of the digital information signal transmitting/receiving system shown in FIG. 17.

By the way, in order for the recorder 300 to start recording stably, it is necessary that the rotating drum 50 and the magnetic tape 60 be left operated for a certain time until they can be stabilized in their operation. Therefore, as shown in FIG. 18, the transmitter 100, after producing the identification signal 171 to 174, makes the interface circuit 19 transmit dummy data 181 to 184 for a constant time T, and then supply the transmission start command 196 to the digital information signal source 1, thereby generating each digital information signal 170 of each program the time T after the identification signal 171 to 174. The recorder 300 can surely record each program from the beginning of the signal since the drum and tape are already stabilized. Here, the time T should be long enough for the recorder 300 to become stabilized from the start of its operation.

The dummy data 181 to 184 is recorded during the time T from the generation of the identification signal 171 to 174 to the generation of the transmission start command 196. Unless the dummy data affects the operation of the receiver-decoder 80, there is particularly no problem.

Figure 19:
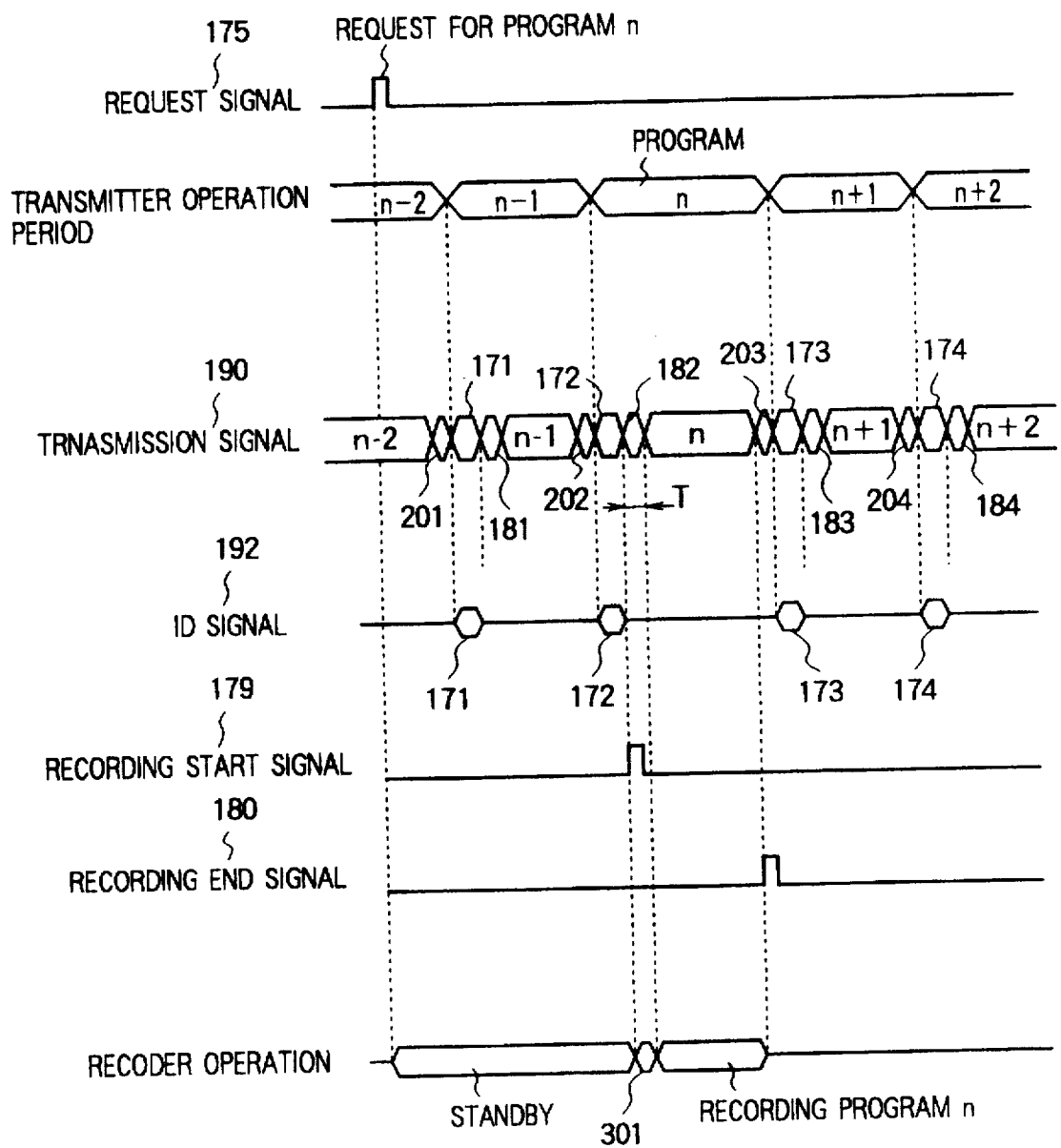
FIG. 19 is a waveform timing chart to which reference is made in explaining another operation of the digital information signal transmitting/receiving system shown in FIG. 17.

While the recorder is stopped in its operation when detecting other identification signals (for example, identification signal 173) than its own identification signal as described above, the recording operation may be stopped by generating the recording end signal 180 when the identification signal detector 54 of the recorder 300 detects, as shown in FIG. 19, an end command signal 203 of end command signals 201 to 204 transmitted from the transmitter 100. Therefore, even if no subscribers request the transmitter 100 to transmit the program (n+1) and so on, thus the identification signal 173 being not necessary to transmit, then the recording operation can be stopped. In addition, the recorder may be stopped in its operation either when other identification signal (for example, identification signal 173) than its own identification signal as shown in FIGS. 15 and 16 is detected or when the end command signal 203 as shown in FIG. 19 is detected.

While in FIG. 19 the identification signals 172, the program 170 and end command signal 203 are all multiplexed, only the identification signals 172 and end command signal 203 may be multiplexed on channel 191 shown in FIG. 13, with only the program 170 being transmitted on channel 190.

In addition, as described above, time T is taken long enough for the recorder 300 to be stabilized in its operation before the start of actual recording, but in this case a problem still remains in the recording operation accuracy and tape consumption. Thus, it can be considered that the transmission is started immediately after the recorder 300 is stabilized in its operation.

Figure 20:
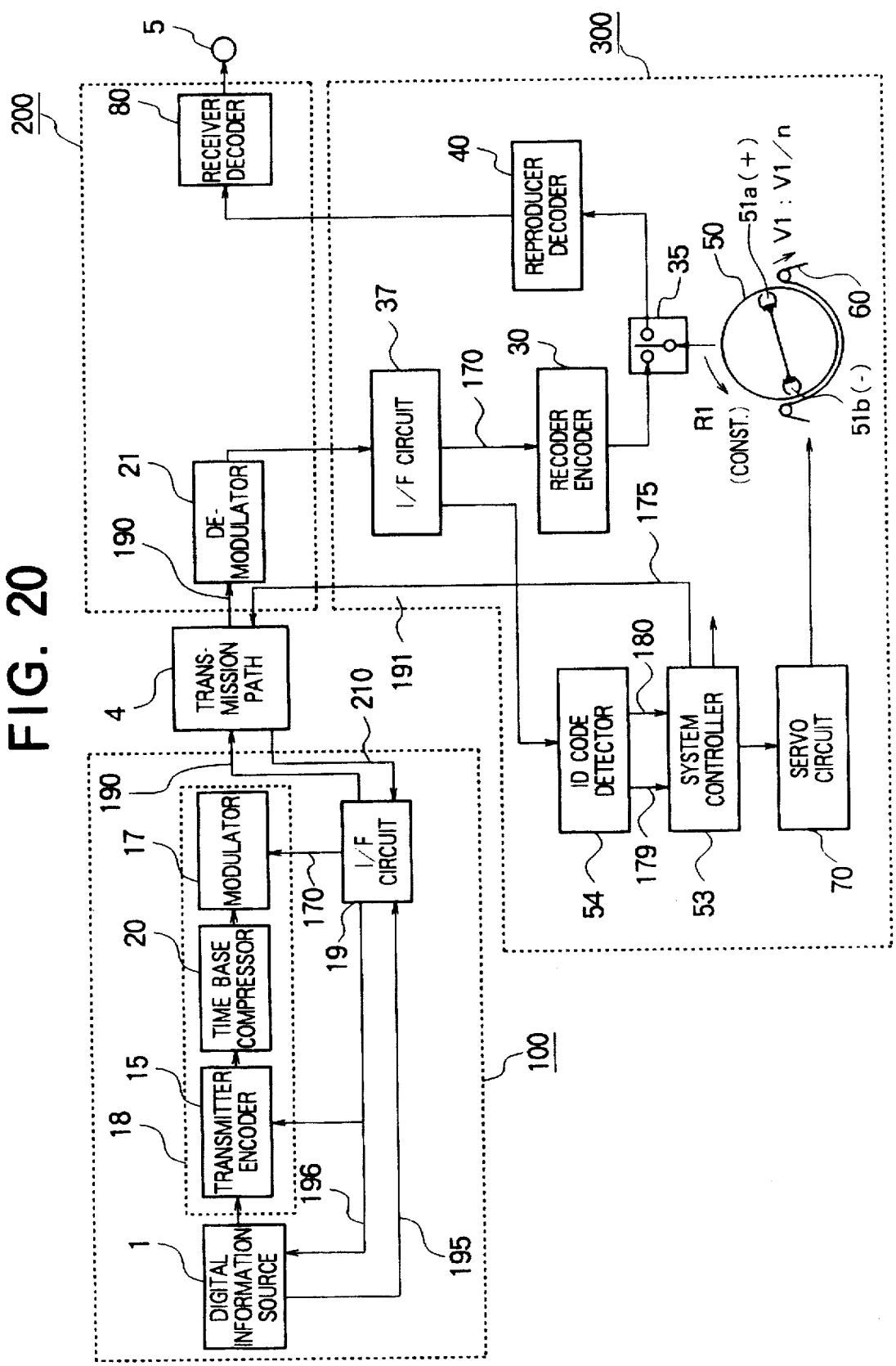
FIG. 20 is a block diagram of still another embodiment of a digital information signal transmitting/receiving system of the invention.

FIG. 20 is a block diagram of a still another embodiment of a digital information signal recording system considering this point, according to this invention. In FIG. 20, like elements corresponding to those in FIG. 13 are identified by the same reference numerals.

Figure 21:
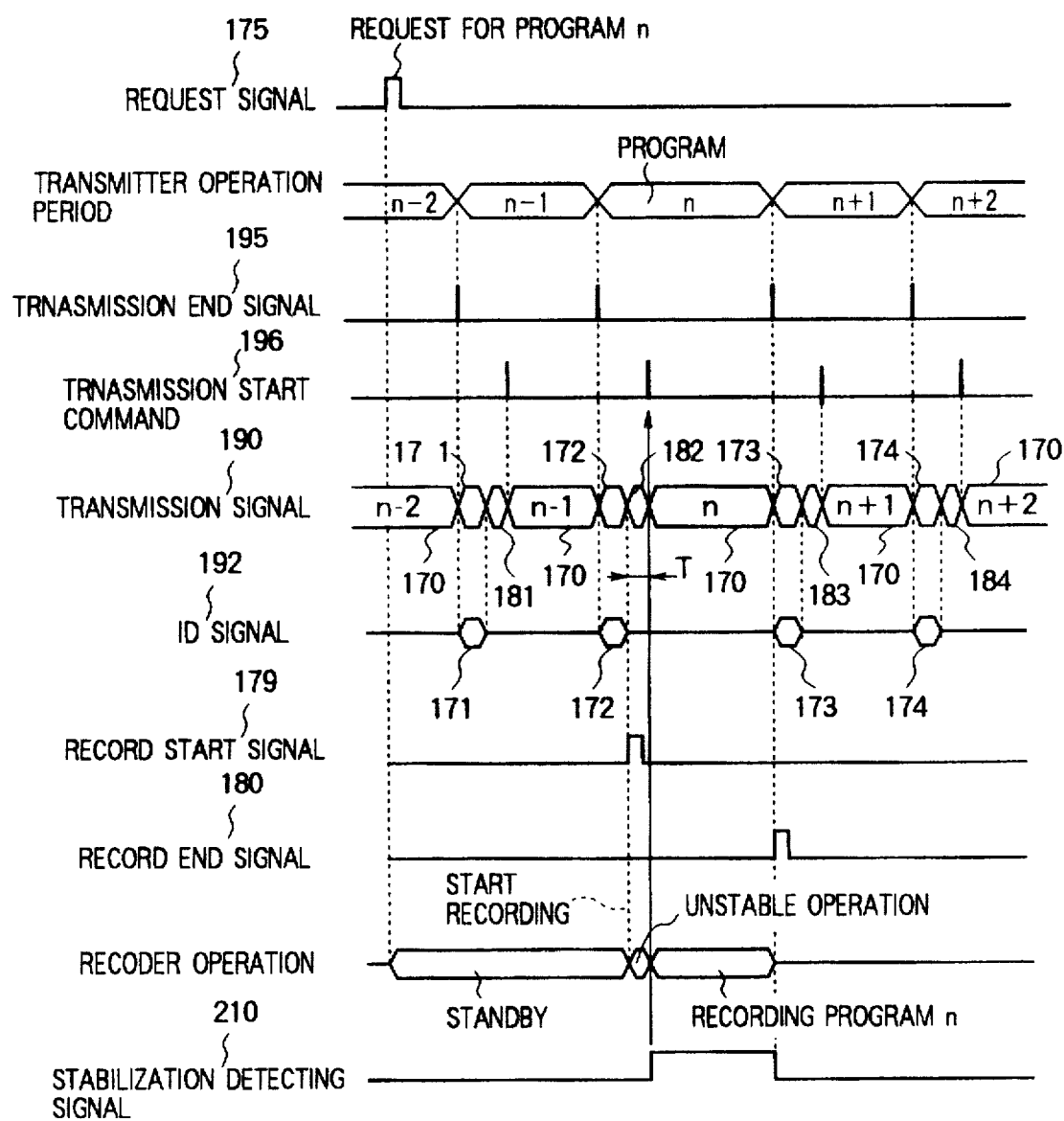
FIG. 21 is a waveform timing chart to which reference is made in explaining the operation of the digital information signal transmitting/receiving system shown in FIG. 20.

FIG. 21 is a timing chart for the operation of this embodiment.

Referring to FIGS. 20 and 21, the transmitter 100 produces the identification signals 172, and the recorder 300 starts its recording operation. Then, when the servo circuit 70 detects that the recording operation has been stabilized, from the detection of phase lock, it supplies a stabilization detecting signal 210 to the system control circuit 53, which transmits it through the transmission path 4 to the interface circuit 19 of the transmitter 100. Immediately after receiving this stabilization detecting signal 210, the interface circuit 19 supplies the transmission start command 196 to the digital information signal source 1, causing it to transmit the program n signal 170 to the recorder 300. Thus, the transmission of the program can be started accurately after the recorder 300 is stabilized. In addition, the amount of dummy data 181 to 184 can be reduced and hence the useless tape consumption can be prevented.

While in this embodiment the identification signals 173 of other users shown in FIG. 15 are used for controlling the recorder 300 to stop its recording operation, the end command signal 203 can also be used to achieve the same effect as shown in FIG. 19. Moreover, the stabilization detecting signal 210 may be multiplexed with the request signal 175.

Figure 22:
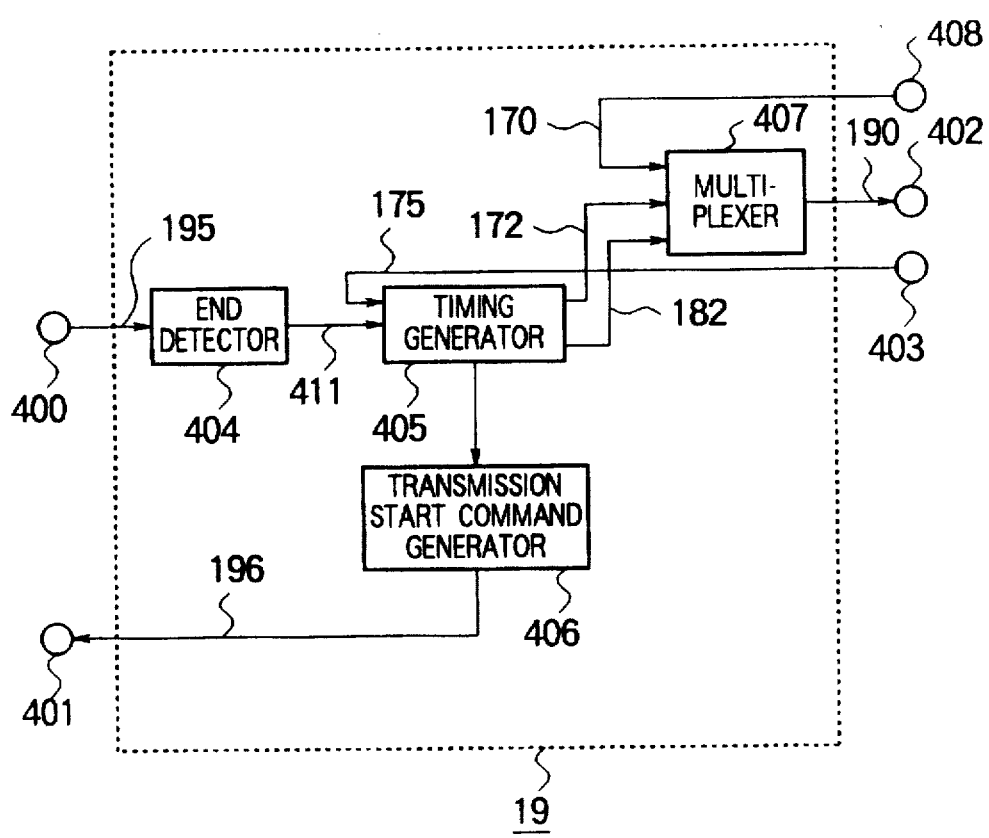
FIG. 22 is a block diagram of one example of an interface circuit in the digital information signal transmitting/receiving system shown in FIG. 13.

FIG. 22 is a block diagram of a specific example of the interface circuit 19 shown in FIG. 17. Referring to FIG. 22, there are shown an input terminal 400 for the transmission end signal, an output terminal 401 for the transmission start command, an output terminal 402 for the multiplex signal, an input terminal 403 for the request signal, a transmission end detector 404, a timing generator 405, a transmission start command generator 406, a multiplexing circuit 407 and a modulation signal input circuit 408.

The operation of the interface circuit will be described with reference to FIG. 22. When the transmission end detector 404 detects the end of the transmission of up to the program (n−1), the timing generator 405 generates the identification signals 172 and dummy data 182 and supplies them to the recorder 300 through the multiplex circuit 407 and output terminal 402. Then, after the lapse of time T, the transmission start command generator 406 generates the transmission start command 196 and supplies it to the digital information signal source 1, thereby causing the signal source to transmit the transmission signal 172 to the recorder 300 through the multiplex circuit 407 and output terminal 402.

Figure 23:
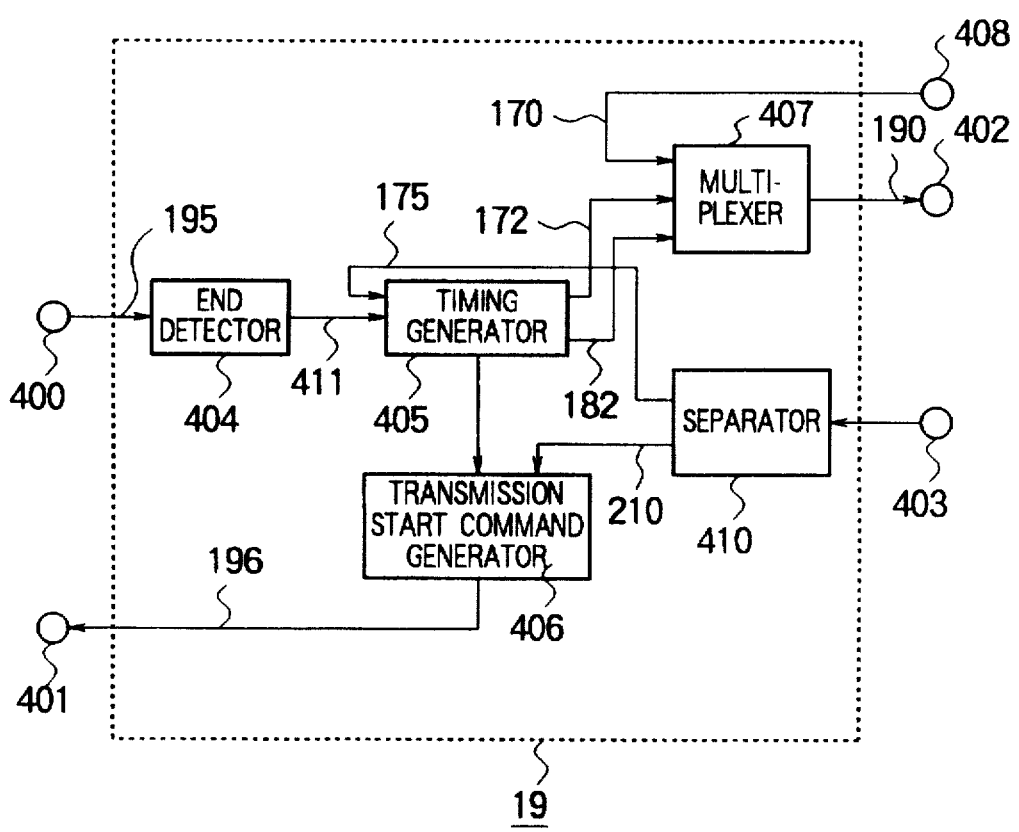
FIG. 23 is a block diagram of one example of an interface circuit in the digital information signal transmitting/receiving system shown in FIG. 20.

FIG. 23 is a block diagram of a specific example of the interface circuit 19 shown in FIG. 20. In FIG. 23, reference numeral 410 indicates a separator for separating the request signal 175 and the stabilization detecting signal 210. In FIG. 23, like elements corresponding to those in FIG. 22 are identified by the same reference numerals.

A multiplex signal of stabilization detecting signal 210 and request signal 175 is applied through the input terminal 403 to the separator 410. The request signal 175 from the separator 410 is supplied to the timing generator 405, and the stabilization detecting signal 210 therefrom to the transmission start command generator 406. The transmission start command generator 406 supplies the transmission start command 196 to the digital information signal source 1. The following operations are the same as shown in FIG. 22.

In each embodiment mentioned above, the interface circuit 37 and identification signal detector 54 may be provided in the receiver 200 instead of being provided in the recorder 300.

In addition, while the time-base compressor 20 is provided in the transmitter 100 in FIGS. 13, 17 and 20, it may be removed therefrom in this invention because the same effect can be achieved even when N given above is 1, or when the transport speed of the magnetic tape 60 in the recording mode is equal to that in the reproduction mode.

Thus, according to this invention, in a recorded-program selling or renting system for distributing audio and video programs on a radio wave or through a cable to recorders in order to sell or rent the recorded programs to the subscribers, the corresponding one of the recorders which requested for a program is started to operate when its own identification signal is sent from the transmitter, so that only a necessary information signal can be recorded under the control of the transmitter side.

Moreover, according to this invention, since the fact that the recorder has been stabilized in its operation is conveyed to the transmitter side, the transmission of information signal can be surely started after the recording operation has been stabilized, and therefore the information signal can be entirely recorded without losing its beginning portion.

What is claimed is:

1. A digital information signal transmitting/receiving method in a system including a transmitter for transmitting an encrypted digital information signal and a plurality of receivers for receiving said encrypted digital information signal transmitted from said transmitter, wherein the transmitting method in said transmitter comprises the steps of:

transmitting a plurality of identification codes to said receivers at a time ahead of said digital information signal; and transmitting said encrypted digital information signal; and the receiving method in each of the receivers comprises the steps of:

detecting whether a particular identification code which is assigned to the receiver is included within a received said plurality of identification codes; and decrypting a received said encrypted digital information signal into original digital information when said particular identification code has been detected in said detecting step.

2. A digital information signal transmitting/receiving method according to claim 1, wherein the transmitting method in said transmitter transmits said plurality of identification codes at a time during a first period and continuously transmits said encrypted digital information signal during a second period after said first period.

3. A digital information signal transmitting/receiving method according to claim 1, wherein said plurality of identification codes and said encrypted digital information signal are encoded into a common segment-type format and transmitted.

4. A digital information signal transmitting/receiving method according to claim 3, wherein said transmitter transmits a record start signal following said plurality of identification codes and transmits a record end signal following said encrypted digital information signal, and said recorder/reproducer is started to record said encrypted digital information signal on said recording medium in response to said record start signal received through said receiver and stopped from recording said encrypted digital information signal in response to said record end signal received through said receiver.

5. A digital information signal transmitting/receiving method in a system including a transmitter for transmitting an encrypted digital information signal, a plurality of receivers for receiving said encrypted digital information signal transmitted from said transmitter, and recorder/reproducers for recording said encrypted digital information signal received by said receivers on a recording medium and reproducing said encrypted digital information signal from said medium, wherein the transmitting method in said transmitter comprises the steps of:

transmitting a plurality of identification codes to said receivers at a time ahead of said digital information signal; and transmitting said encrypted digital information signal, the receiving method in each of the receivers comprises the steps of:

supplying a received said plurality of identification codes and a received said encrypted digital information signal to said recorder/reproducers;

detecting whether a particular identification code which is assigned to the receiver is included within a received said plurality of identification codes; and decrypting said encrypted digital information signal reproduced by said recorder/reproducer into original digital information when said particular identification code has been detected in said detecting step, and the recording/reproducing method in said recorder/reproducer comprises the steps of:

placing the recorder of said recorder/reproducer in a standby mode in response to said identification codes fed from said receiver;

recording said encrypted digital information signal from said receiver on said recording medium; and reproducing said encrypted digital information signal recorded on said recording medium and supplying a reproduced said encrypted digital information signal to said receiver.

6. A digital information signal transmitting/receiving method according to any one of claim 4 or 5, wherein said plurality of identification codes and said encrypted digital information signal are encoded into a common segment-type format and transmitted.

7. A digital information signal transmitting/receiving method according to any one of claim 4 or 5, wherein the transmitting method in said transmitter further compresses a time base of said encrypted digital information signal and transmits a time-base compressed encrypted digital information signal at a higher speed than an original signal speed, and the reproducing method in said recorder/reproducers further reproduces a recorded said time-base compressed encrypted digital information signal at a lower speed than said original signal speed to thereby expand the time base.

8. A digital information signal transmitting/receiving system having a transmitter for transmitting a digital information signal and a plurality of receivers for receiving said digital information signal transmitted from said transmitter, wherein said transmitter comprises:

means for encrypting said digital information signal to produce an encrypted digital information signal;

means for generating a plurality of identification codes associated with said receivers;

switching means for selectively outputting said encrypted digital information signal and said plurality of identification codes such that said plurality of identification codes are output at a time ahead of said encrypted digital information signal;

encoding means for encoding an output from said switching means into a predetermined format; and modulating means for modulating an output from said encoding means and transmitting a modulated output, wherein said plurality of identification codes are transmitted at a time ahead of said digital information signal, and each of said receivers comprises:

means for demodulating a received said modulated output to produce a demodulated digital signal;

means for decoding said demodulated digital signal to produce a decoded digital signal;

memory means for storing a particular identification signal associated with the receiver, collating means for detecting whether a same identification code as said particular identification code stored in said memory means is included within said decoded digital signal; and decrypting means for decrypting said decoded digital signal into original digital information when said particular identification code has been detected in said collating means.

9. A digital-information signal transmitting/receiving system having a transmitter for transmitting a digital information signal, a plurality of receivers for receiving said digital information signal transmitted from said transmitter, and a recorder/reproducer for recording said digital information signal received by said receivers on a recording medium and reproducing said digital information signal, wherein said transmitter comprises:

means for encrypting said digital information signal to produce an encrypted digital information signal;

means for generating a plurality of identification codes associated with said receivers;

switching means for selectively outputting said encrypted digital information signal and said plurality of identification codes such that said plurality of identification codes are output at a time ahead of said encrypted digital information signal;

first encoding means for encoding an output from said switching means into a first format; and modulating means for modulating an output from said first encoding means and transmitting a modulated output, wherein said plurality of identification codes are transmitted at a time ahead of said digital information signal, and each of said receivers comprises:

means for demodulating a received said modulated output including said received identification codes and said encrypted digital information signal into a demodulated digital signal;

first decoding means for decoding said demodulated digital signal and supplying a decoded digital signal to a corresponding said recorder/reproducer;

memory means for storing a particular identification signal associated with the receiver;

collating means for detecting whether a same identification code as said particular identification code stored in said memory means is included within said decoded digital signal; and decrypting means for decrypting said encrypted digital signal decoded by said corresponding recorder/reproducer into original digital information when said particular identification code has been detected in said collating means, and each of said recorder/reproducers comprises:

second encoding means for encoding a decoded, encrypted digital information signal produced from said first decoding means into a second format;

a recording/reproducing unit for recording the output from said second encoding means on said recording medium and reproducing said digital information signal from said recording medium, said recording/reproducing unit being placed in a standby mode in response to said identification codes included in the output from said second encoding means and caused to record said output on said recording medium in response to said encrypted digital information signal following said identification codes; and second decoding means for decoding a reproduced digital information signal from said recording/reproducing unit and supplying a decoded digital information signal to said receiver.

10. A digital information signal transmitting/receiving system according to claim 9, wherein said transmitter transmits a record start signal following said plurality of identification codes and transmits a record end signal following said encrypted digital information signal, and said recorder/reproducers are responsive to said record start signal received through said receivers to start to record said output on said recording medium and responsive to said record end signal received through said receivers to stop recording said output.

11. A digital information signal transmitting/receiving system according to claim 10, wherein said transmitter further comprises means for compressing the output from said first encoding means to an extent of 1/N, where N is an integer of 2 or more, of the original time base and supplying a compressed output to said modulating means, and said recording/reproducing units record the output from said second encoding means on said recording medium at a predetermined speed and reproduce said recorded digital information signal at 1/N of said predetermined recording speed.

12. A digital information recording system having a transmitter for transmitting a digital information signal, a receiver for receiving said digital information signal distributed from said transmitter, and a recorder for recording said digital information signal received by said receiver, wherein at least one of said receiver and said recorder has means for generating an information request signal, said transmitter has means which responds to said information request signal by adding to said digital information signal an identification signal for identifying a corresponding said at least one receiver and recorder which has generated said information request signal, wherein said identification signal is added to be provided at a time ahead of said digital information signal, and to transmit as a transmission signal a combined signal formed of said identification signal and said digital information signal to said receiver, and said recorder has means for controlling an operation of recording a received said digital information signal on a basis of said received identification signal.

13. A digital information recording system according to claim 12, wherein said recorder further comprises identification signal input means for receiving identification signals from said transmitter, identification signal detecting means for detecting whether a particular identification signal assigned to said at least one receiver and recorder is insulated within said identification signals, and a recording unit for recording said digital information signal on a recording medium, said recording unit being started to record said digital information signal when said identification signal detecting means detects said particular identification signal.

14. A digital information recording system according to claim 12, wherein said transmitting means of said transmitter generates a multiplex signal formed of identification signals and said digital information signal as said transmission signal, said recorder further comprises separating means for separating a received said multiplex signal into said digital information signal and said identification signals, and said control means controls said recording operation to be started on a basis of an analysis of separated identification signals.

15. A digital information recording system according to claim 14, wherein said recorder comprises identification signal detecting means for detecting whether a particular identification signal produced from said separating means is assigned to said at least one receiver and recorder, and a recording unit for recording separated said identification signals on a recording medium, and said control means the recording operation controls said recording unit to start recording said digital information signal when said identification signal detecting means detects that said particular identification signal assigned to said at least one receiver and recorder has been received.

16. A digital information recording system according to claim 14, wherein said recorder comprises identification signal detecting means for detecting whether any particular identification signals produced from said separating means are assigned to said at least one receiver and recorder, and a recording unit for recording separated said digital information signals on a recording medium, and said recording operation control means allows recording of said digital information signal when said identification signal detecting means detects that said particular identification signals assigned to said at least one receiver and recorder have been received.

17. A digital information recording system having a transmitter for transmitting a digital information signal, a receiver for receiving said digital information signal distributed from said transmitter, and a recorder for recording said digital information signal received by said receiver on a recording medium, wherein at least one of said receiver and said recorder has means for generating an information request signal, said transmitter has means which responds to said information request signal by adding identification signals to said digital information signal for identifying said at least one receiver and recorder which generated said information request signal, wherein said identification signals are added to be provided at a time ahead of said digital information signal, and to transmit a combined signal formed of said digital information signal and said identification signals to said receiver, and said recorder has control means which records said received information signal when particular identification signals assigned to said at least one receiver and recorder are received, which prevents recording when said particular identification signals are not received.

18. A digital information recording system according to claim 17, wherein said recorder further comprises identification signal input means for receiving said identification signals from said transmitter, identification signal detecting means for detecting whether said particular identification signals are received by said identification signal input means, and a recording unit for recording said digital information signal received by said receiver on a recording medium, and said control means controls said digital information signal to be recorded when said identification signal detecting means detects said particular identification signals and to be stopped from recording at least when said particular identification signals associated with the corresponding receiver or recorder is not detected by said identification signal detecting means from said identification signals received during a recording operation.

19. A digital information recording system according to claim 17, wherein said transmitting means of said transmitter generates a multiplex signal formed of said identification signals and said digital information signal as said transmission signal, said recorder further comprises separating means for separating a received said multiplex signal into said identification signals and said digital information signal, and said control means controls said recording operation to start on a basis of an analysis separated identification signals.

20. A digital information recording system according to claim 19, wherein said recorder comprises identification signal detecting means for detecting whether particular identification signals produced from said separating means are assigned to said at least one receiver and recorder, and a recording unit for recording separated said identification signals on a recording medium, and said control means for the recording operation allows recording of said digital information signal when said identification signal detecting means detects that said particular identification signals assigned to said at least one receiver and recorder have been received and inhibits recording when said identification signals received during the recording operation do not include said particular identification signal assigned to said at least one receiver and.

21. A digital information recording system having a transmitter for distributing a digital information signal, a receiver for receiving said digital information signal distributed from said transmitter, and a recorder for recording said digital information signal received by said receiver on a recording medium, wherein at least one of said receiver and said recorder has means for generating an information request signal;

said transmitter has transmitting means which responds to said information request signals by adding to said digital information signal, identification signals for identifying said at least one receiver and recorder which generated said information request signals and a record end signal, wherein said identification signals are added to be provided at a time ahead of said digital information signal, thus producing a transmission signal formed of said digital information signal, said identification signals and said record end signal and to distribute said transmission signal to said receiver; and said recorder has control means which records a received said digital information signal when particular identification signals assigned to said at least one receiver and recorder are detected from said received identification signals and which stops recording when said record end signal is received.

22. A digital information recording system according to claim 21, wherein said recorder further comprises identification signal input means for receiving said identification signals from said transmitter, identification signal detecting means for detecting said whether said particular identification signals is received by said identification signal input means, record end signal input means for receiving said record end signal from said transmitter, and a recording unit for recording said digital information signal received by said receiver on a recording medium, and said control means records said digital information signal when said identification signals assigned to said at least one receiver and recorder, and stops recording at least when said record end signal is fed to said record end signal input means during the recording operation.

23. A digital information recording system according to claim 21, wherein said transmitting means of said transmitter comprises means for generating a multiplex signal formed of said identification signals and said record end signal and distributing said multiplex signal to said receiver, said recorder further comprises separating means for separating a received said multiplex signal into said identification signals and said record end signal, and said recording operation control means controls the recording operation to be started on the basis of an analysis of said separated identification signals and to be stopped on the basis of said separated record end signal.

24. A digital information recording system according to claim 21, wherein said transmitting means of said transmitter generates a multiplex signal formed of said identification signals, said digital information signal and said record end signals as said transmission signal, said recorder further comprises separating means for separating a received said multiplex signal into said identification signals, said digital information signal and said record end signal, and said recording operation control means controls the recording operation to start on a basis of an analysis of separated said identification signals and to stop recording on a basis of a separated said record end signal.

25. A digital information recording system according to claim 24, wherein said recorder comprises identification signal detecting means for detecting whether any particular identification signals produced from said separating means are assigned to said at least one receiver and recorder, and a recording unit for recording separated said digital information signal on a recording medium, and said recording operation control means controls said digital information signal to be started to record when said identification signal detecting means detects that said particular identification signals assigned to said at least one receiver and recorder have been received, and stopped from recording when said record end signal is received during the recording operation.

26. A digital information recording system according to any one of claims 12, 17 and 21, wherein said recorder further comprises means for generating a stabilization detecting signal when said recorder performs a stable recording operation on said recording medium, and means for transmitting said stabilization detecting signal to said transmitter, and said transmitter transmits said digital information signal in response to said stabilization detecting signals.

27. A digital information recording system according to any one of claims 12, 17 and 21, wherein said recorder further comprises means for generating a stabilization detecting signal when said recorder performs a stable recording operation on said recording medium, and means for transmitting said stabilization detecting signal and said information request signal on a common channel to said transmitter, and said transmitter transmits said digital information signal in response to said stabilization detecting signals.

* * * * *